(12) United States Patent
Andrade Dias et al.

(10) Patent No.: US 11,458,802 B2
(45) Date of Patent: Oct. 4, 2022

(54) OPTIMIZED POWER MANAGEMENT FOR A TRANSPORT CLIMATE CONTROL ENERGY SOURCE

(71) Applicant: THERMO KING CORPORATION, Minneapolis, MN (US)

(72) Inventors: Marcelo Andrade Dias, Lakeville, MN (US); Ryan Wayne Schumacher, Bloomington, MN (US); Mark D. Leasure, Eagan, MN (US); Vikram Madineni, Dusseldorf (DE); Alexander Iglizn, Essen (DE); Matthias Gorski, Bochum (DE)

(73) Assignee: Thermo King Corporation, Minneapolis, MN (US)

( * ) Notice: Subject to any disclaimer, the term of this patent is extended or adjusted under 35 U.S.C. 154(b) by 390 days.

(21) Appl. No.: 16/565,146

(22) Filed: Sep. 9, 2019

(65) Prior Publication Data
US 2021/0070137 A1    Mar. 11, 2021

(51) Int. Cl.
*H02J 7/00* (2006.01)
*B60H 1/00* (2006.01)
(Continued)

(52) U.S. Cl.
CPC .......... *B60H 1/00428* (2013.01); *H02J 1/002* (2020.01); *H02J 3/322* (2020.01);
(Continued)

(58) Field of Classification Search
CPC ........ H02J 7/0068; H02J 7/34; H02J 2310/40; H02J 3/322; H02J 1/002; H02M 7/797;
(Continued)

(56) References Cited

U.S. PATENT DOCUMENTS

| | | |
|---|---|---|
| 3,875,483 A | 4/1975 | Farr |
| 5,104,037 A | 4/1992 | Karg et al. |

(Continued)

FOREIGN PATENT DOCUMENTS

| | | |
|---|---|---|
| CN | 2456117 | 10/2001 |
| CN | 1885660 | 12/2006 |

(Continued)

OTHER PUBLICATIONS

Yang et al., "The Role of Thermal Plume in Person-to-Person Contaminant Cross Transmission", 2017 Winter Conference, Seminar 36; Modeling and Control of the Personal Microenvironment, 5 pages.

(Continued)

*Primary Examiner* — Harry R Behm
(74) *Attorney, Agent, or Firm* — Hamre, Schumann, Mueller & Larson, P.C.

(57) ABSTRACT

An optimized power converter for use in a transport electrical system that provides power to a transport climate control system is provided. The optimized power converter includes an optimized DC/DC converter and an inverter/active rectifier. The optimized DC/DC converter is only boosts a voltage level when current is directed from a rechargeable energy storage to the inverter/active rectifier and only bucks a voltage level when current is directed from the inverter/active rectifier to the rechargeable energy storage. In a charging mode, the inverter/active rectifier converts three phase AC power into DC power, and the optimized power converter bucks the DC power to a voltage level that is acceptable for charging the rechargeable energy storage. In a discharge mode, the optimized DC/DC converter boosts voltage from the rechargeable energy storage, and the inverter/active rectifier converts boosted DC power into (Continued)

three phase AC power for powering a transport climate control system load.

20 Claims, 9 Drawing Sheets

(51) Int. Cl.
| | |
|---|---|
| *H02M 7/797* | (2006.01) |
| *H02J 1/00* | (2006.01) |
| *H02J 7/34* | (2006.01) |
| *H02J 3/32* | (2006.01) |
| *H02M 1/00* | (2006.01) |
| *B60H 1/32* | (2006.01) |

(52) U.S. Cl.
CPC .............. *H02J 7/0068* (2013.01); *H02J 7/34* (2013.01); *H02M 1/007* (2021.05); *H02M 7/797* (2013.01); *B60H 2001/3292* (2013.01); *H02J 2310/40* (2020.01)

(58) Field of Classification Search
CPC .............. H02M 1/007; B60H 1/00428; B60H 2001/3292
See application file for complete search history.

(56) References Cited

U.S. PATENT DOCUMENTS

| | | | |
|---|---|---|---|
| 5,231,849 A | 8/1993 | Rosenblatt | |
| 6,280,320 B1 | 8/2001 | Paschke et al. | |
| 6,487,869 B1 | 12/2002 | Sulc et al. | |
| 6,518,727 B2 | 2/2003 | Oomura et al. | |
| 6,560,980 B2 | 5/2003 | Gustafson et al. | |
| 6,600,237 B1 | 7/2003 | Meissner | |
| 6,631,080 B2 | 10/2003 | Trimble et al. | |
| 6,652,330 B1 | 11/2003 | Wasilewski | |
| 6,688,125 B2 | 2/2004 | Okamoto et al. | |
| 6,753,692 B2 | 6/2004 | Toyomura et al. | |
| 6,925,826 B2 | 8/2005 | Hille et al. | |
| 7,011,902 B2 | 3/2006 | Pearson | |
| 7,120,539 B2 | 10/2006 | Krull et al. | |
| 7,122,923 B2 | 10/2006 | Lafontaine et al. | |
| 7,151,326 B2 | 12/2006 | Jordan | |
| 7,176,658 B2 | 2/2007 | Quazi et al. | |
| 7,206,692 B2 | 4/2007 | Beesley et al. | |
| 7,327,123 B2 | 2/2008 | Faberman et al. | |
| 7,424,343 B2 | 9/2008 | Kates | |
| 7,449,798 B2 | 11/2008 | Suzuki et al. | |
| 7,532,960 B2 | 5/2009 | Kumar | |
| 7,728,546 B2 | 6/2010 | Tanaka et al. | |
| 7,730,981 B2 | 6/2010 | McCabe et al. | |
| 7,745,953 B2 | 6/2010 | Puccetti et al. | |
| 7,806,796 B2 | 10/2010 | Zhu | |
| 7,830,117 B2 | 11/2010 | Ambrosio et al. | |
| 7,898,111 B1 | 3/2011 | Pistel | |
| 7,900,462 B2 | 3/2011 | Hegar et al. | |
| 8,020,651 B2 | 9/2011 | Zillmer et al. | |
| 8,030,880 B2 | 10/2011 | Alston et al. | |
| 8,134,339 B2 | 3/2012 | Burlak et al. | |
| 8,170,886 B2 | 5/2012 | Luff | |
| 8,214,141 B2 | 7/2012 | Froeberg | |
| 8,295,950 B1 | 10/2012 | Wordsworth et al. | |
| 8,381,540 B2 | 2/2013 | Alston | |
| 8,441,228 B2 | 5/2013 | Brabec | |
| 8,476,872 B2 | 7/2013 | Truckenbrod et al. | |
| 8,487,458 B2 | 7/2013 | Steele et al. | |
| 8,541,905 B2 | 9/2013 | Brabec | |
| 8,602,141 B2 | 12/2013 | Yee et al. | |
| 8,626,367 B2 | 1/2014 | Krueger et al. | |
| 8,626,419 B2 | 1/2014 | Mitchell et al. | |
| 8,643,216 B2 | 2/2014 | Lallin | |
| 8,643,217 B2 | 2/2014 | Gietzold et al. | |
| 8,670,225 B2 | 3/2014 | Nunes | |
| 8,723,344 B1 | 5/2014 | Dierickx | |
| 8,742,620 B1 | 6/2014 | Brennan et al. | |
| 8,760,115 B2 | 6/2014 | Kinser et al. | |
| 8,764,469 B2 | 7/2014 | Lamb | |
| 8,767,379 B2 | 7/2014 | Whitaker | |
| 8,818,588 B2 | 8/2014 | Ambrosio et al. | |
| 8,862,356 B2 | 10/2014 | Miller | |
| 8,912,683 B2 | 12/2014 | Dames et al. | |
| 8,924,057 B2 | 12/2014 | Kinser et al. | |
| 8,978,798 B2 | 5/2015 | Dalum et al. | |
| 9,030,336 B2 | 5/2015 | Doyle | |
| 9,061,680 B2 | 6/2015 | Dalum | |
| 9,093,788 B2 | 7/2015 | Lamb | |
| 9,102,241 B2 | 8/2015 | Brabec | |
| 9,147,335 B2 | 9/2015 | Raghunathan et al. | |
| 9,199,543 B2 | 12/2015 | Brabec | |
| 9,313,616 B2 | 4/2016 | Mitchell et al. | |
| 9,436,853 B1 | 9/2016 | Meyers | |
| 9,440,507 B2 | 9/2016 | Giovanardi et al. | |
| 9,463,681 B2 | 10/2016 | Olaleye et al. | |
| 9,464,839 B2 | 10/2016 | Rusignuolo et al. | |
| 9,557,100 B2 | 1/2017 | Chopko et al. | |
| 9,562,715 B2 | 2/2017 | Kandasamy | |
| 9,694,697 B2 | 7/2017 | Brabec | |
| 9,738,160 B2 | 8/2017 | Bae et al. | |
| 9,758,013 B2 | 9/2017 | Steele | |
| 9,783,024 B2 | 10/2017 | Connell et al. | |
| 9,784,780 B2 | 10/2017 | Loftus et al. | |
| 9,825,549 B2 | 11/2017 | Choi et al. | |
| 9,846,086 B1 | 12/2017 | Robinson et al. | |
| 9,893,545 B2 | 2/2018 | Bean | |
| 9,931,960 B2 | 4/2018 | Tabatowski-Bush et al. | |
| 9,975,403 B2 | 5/2018 | Rusignuolo et al. | |
| 9,975,446 B2 | 5/2018 | Weber et al. | |
| 9,987,906 B2 | 6/2018 | Kennedy | |
| 10,000,122 B2 | 6/2018 | Wu et al. | |
| 10,148,212 B2 | 12/2018 | Schumacher et al. | |
| 10,240,847 B1 | 3/2019 | Thomas, Jr. | |
| 2002/0113576 A1 | 8/2002 | Oomura et al. | |
| 2003/0043607 A1 | 3/2003 | Vinciarelli et al. | |
| 2003/0106332 A1 | 6/2003 | Okamoto et al. | |
| 2003/0200017 A1 | 10/2003 | Capps et al. | |
| 2003/0201097 A1 | 10/2003 | Zeigler et al. | |
| 2005/0057210 A1 | 3/2005 | Ueda et al. | |
| 2005/0065684 A1 | 3/2005 | Larson et al. | |
| 2006/0284601 A1 | 12/2006 | Salasoo et al. | |
| 2007/0052241 A1 | 3/2007 | Pacy | |
| 2007/0192116 A1 | 8/2007 | Levitt | |
| 2008/0177678 A1 | 7/2008 | Di Martini et al. | |
| 2008/0281473 A1 | 11/2008 | Pitt | |
| 2009/0107743 A1* | 4/2009 | Alston | H02J 7/1423 180/65.21 |
| 2009/0121798 A1 | 5/2009 | Levinson | |
| 2009/0122901 A1 | 5/2009 | Choi et al. | |
| 2009/0126901 A1 | 5/2009 | Hegar et al. | |
| 2009/0178424 A1 | 7/2009 | Hwang et al. | |
| 2009/0195349 A1 | 8/2009 | Frader-Thompson et al. | |
| 2009/0228155 A1 | 9/2009 | Slifkin et al. | |
| 2009/0314019 A1 | 12/2009 | Fujimoto et al. | |
| 2009/0320515 A1 | 12/2009 | Bischofberger et al. | |
| 2010/0045105 A1 | 2/2010 | Bovio et al. | |
| 2010/0230224 A1 | 9/2010 | Hindman | |
| 2010/0312425 A1 | 12/2010 | Obayashi et al. | |
| 2010/0320018 A1 | 12/2010 | Gwozdek et al. | |
| 2011/0000244 A1 | 1/2011 | Reason et al. | |
| 2011/0114398 A1 | 5/2011 | Bianco | |
| 2011/0118916 A1 | 5/2011 | Gullichsen | |
| 2011/0162395 A1 | 7/2011 | Chakiachvili et al. | |
| 2011/0208378 A1 | 8/2011 | Krueger et al. | |
| 2011/0224841 A1 | 9/2011 | Profitt-Brown et al. | |
| 2011/0241420 A1 | 10/2011 | Hering et al. | |
| 2011/0248563 A1* | 10/2011 | Komma | B60L 53/24 307/9.1 |
| 2011/0290893 A1 | 12/2011 | Steinberg | |
| 2012/0000212 A1 | 1/2012 | Sanders et al. | |
| 2012/0019231 A1* | 1/2012 | Chen | H02M 7/48 323/312 |
| 2012/0116931 A1 | 5/2012 | Meyers | |
| 2012/0153722 A1 | 6/2012 | Nazarian | |
| 2012/0198866 A1 | 8/2012 | Zeidner | |

(56) References Cited

U.S. PATENT DOCUMENTS

| | | |
|---|---|---|
| 2012/0310376 A1 | 12/2012 | Krumm et al. |
| 2012/0310416 A1 | 12/2012 | Tepper et al. |
| 2013/0000342 A1 | 1/2013 | Blasko et al. |
| 2013/0073094 A1 | 3/2013 | Knapton et al. |
| 2013/0088900 A1 | 4/2013 | Park |
| 2013/0158828 A1 | 6/2013 | McAlister |
| 2013/0231808 A1 | 9/2013 | Flath et al. |
| 2014/0018969 A1 | 1/2014 | Forbes, Jr. |
| 2014/0020414 A1 | 1/2014 | Rusignuolo et al. |
| 2014/0026599 A1 | 1/2014 | Rusignuolo et al. |
| 2014/0060097 A1 | 3/2014 | Perreault |
| 2014/0137590 A1 | 5/2014 | Chopko et al. |
| 2014/0230470 A1 | 8/2014 | Cook |
| 2014/0265560 A1 | 9/2014 | Leehey et al. |
| 2015/0019132 A1 | 1/2015 | Gusikhin et al. |
| 2015/0081212 A1 | 3/2015 | Mitchell et al. |
| 2015/0121923 A1 | 5/2015 | Rusignuolo et al. |
| 2015/0168032 A1 | 6/2015 | Steele |
| 2015/0188360 A1 | 7/2015 | Doane et al. |
| 2015/0306937 A1 | 10/2015 | Kitamura et al. |
| 2015/0316301 A1 | 11/2015 | Kolda et al. |
| 2015/0345958 A1 | 12/2015 | Graham |
| 2015/0355288 A1 | 12/2015 | Yokoyama et al. |
| 2015/0360568 A1 | 12/2015 | Champagne et al. |
| 2016/0011001 A1 | 1/2016 | Emory et al. |
| 2016/0035152 A1 | 2/2016 | Kargupta |
| 2016/0089994 A1 | 3/2016 | Keller et al. |
| 2016/0144764 A1 | 5/2016 | Dutta et al. |
| 2016/0252289 A1 | 9/2016 | Feng et al. |
| 2016/0280040 A1 | 9/2016 | Connell et al. |
| 2016/0285416 A1 | 9/2016 | Tiwari et al. |
| 2016/0291622 A1 | 10/2016 | Al-Mohssen et al. |
| 2016/0327921 A1 | 11/2016 | Ribbich et al. |
| 2016/0377309 A1 | 12/2016 | Abiprojo et al. |
| 2017/0030728 A1 | 2/2017 | Baglino et al. |
| 2017/0057323 A1 | 3/2017 | Neu et al. |
| 2017/0063248 A1 | 3/2017 | Lee et al. |
| 2017/0098954 A1 | 4/2017 | Ferguson et al. |
| 2017/0179745 A1* | 6/2017 | Tritschler ................. B60L 53/11 |
| 2017/0217280 A1 | 8/2017 | Larson et al. |
| 2017/0259764 A1 | 9/2017 | Da Silva Carvalho et al. |
| 2017/0302200 A1 | 10/2017 | Marcinkiewicz |
| 2017/0349078 A1 | 12/2017 | Dziuba et al. |
| 2018/0022187 A1 | 1/2018 | Connell et al. |
| 2018/0029436 A1 | 2/2018 | Zaeri et al. |
| 2018/0029488 A1 | 2/2018 | Sjödin |
| 2018/0087813 A1 | 3/2018 | Senf, Jr. |
| 2018/0111441 A1 | 4/2018 | Menard et al. |
| 2018/0154723 A1 | 6/2018 | Anderson et al. |
| 2018/0156536 A1* | 6/2018 | Shapiro .................. F25B 49/005 |
| 2018/0201092 A1 | 7/2018 | Ahuja et al. |
| 2018/0203443 A1 | 7/2018 | Newman |
| 2018/0222278 A1 | 8/2018 | Mizuma |
| 2018/0306533 A1 | 10/2018 | Alahyari et al. |
| 2018/0334012 A1 | 11/2018 | Geller et al. |
| 2018/0342876 A1 | 11/2018 | Agnew et al. |
| 2018/0342877 A1 | 11/2018 | Yoo et al. |
| 2018/0356870 A1 | 12/2018 | Rusignuolo |
| 2019/0047496 A1 | 2/2019 | Sufrin-Disler et al. |
| 2019/0086138 A1 | 3/2019 | Chopko et al. |
| 2019/0092122 A1 | 3/2019 | Vanous et al. |
| 2019/0123544 A1 | 4/2019 | Pelegris et al. |
| 2019/0184838 A1 | 6/2019 | Lee et al. |
| 2019/0255914 A1 | 8/2019 | Ikeda et al. |
| 2019/0283541 A1 | 9/2019 | Adetola et al. |
| 2019/0308487 A1 | 10/2019 | Badger, II et al. |
| 2020/0050753 A1 | 2/2020 | Davis et al. |
| 2020/0076029 A1 | 3/2020 | Litz |
| 2020/0086744 A1 | 3/2020 | Schumacher et al. |
| 2020/0101820 A1 | 4/2020 | Wenger et al. |
| 2020/0130471 A1 | 4/2020 | Leasure |
| 2020/0130473 A1 | 4/2020 | Schumacher et al. |
| 2020/0136504 A1 | 4/2020 | Schumacher et al. |
| 2020/0207184 A1 | 7/2020 | Schumacher et al. |

FOREIGN PATENT DOCUMENTS

| | | |
|---|---|---|
| CN | 2912069 | 6/2007 |
| CN | 101713577 | 5/2010 |
| CN | 202038315 | 11/2011 |
| CN | 104539184 | 4/2015 |
| CN | 104734178 | 6/2015 |
| CN | 105711376 | 6/2016 |
| CN | 106184252 | 12/2016 |
| CN | 106766419 | 5/2017 |
| CN | 106774131 | 5/2017 |
| CN | 108074466 | 5/2018 |
| CN | 108931006 | 12/2018 |
| CN | 208306320 | 1/2019 |
| CN | 208650989 | 3/2019 |
| DE | 3817365 | 11/1989 |
| DE | 29715576 | 12/1997 |
| DE | 10138750 | 2/2003 |
| DE | 10200637 | 10/2003 |
| DE | 102011050719 | 12/2012 |
| EP | 0282051 | 9/1988 |
| EP | 1935712 | 6/2008 |
| EP | 2365915 | 9/2011 |
| EP | 2689944 | 1/2014 |
| EP | 2717016 | 9/2014 |
| EP | 2942216 | 11/2015 |
| EP | 3343728 | 7/2018 |
| EP | 536552 | 9/2019 |
| EP | 3540340 | 9/2019 |
| GB | 2551999 | 1/2018 |
| JP | 2000158930 | 6/2000 |
| JP | 2007320352 | 12/2007 |
| JP | 2009243780 | 10/2009 |
| JP | 2011188601 A * | 9/2011 |
| JP | 2013067248 A * | 4/2013 |
| JP | 5772439 | 9/2015 |
| JP | 2016086477 A * | 5/2016 |
| JP | 2019145521 | 8/2019 |
| KR | 20110105034 A * | 9/2011 |
| KR | 10-2012-0092834 | 8/2012 |
| WO | 03038988 | 5/2003 |
| WO | 2008/153518 | 12/2008 |
| WO | 2009/155941 | 12/2009 |
| WO | 2010065476 | 6/2010 |
| WO | 2011066468 | 6/2011 |
| WO | 2012/138500 | 10/2012 |
| WO | 2012138497 | 10/2012 |
| WO | 2013096084 | 6/2013 |
| WO | 2014002244 | 1/2014 |
| WO | 2014058610 | 4/2014 |
| WO | 2014085672 | 6/2014 |
| WO | 2014106060 | 7/2014 |
| WO | 2014106456 | 7/2014 |
| WO | 2016/038838 | 3/2016 |
| WO | 2016145107 | 9/2016 |
| WO | 2017058660 | 4/2017 |
| WO | 2017/083333 | 5/2017 |
| WO | 2017/083336 | 5/2017 |
| WO | 2017/151698 | 9/2017 |
| WO | 2017172484 | 10/2017 |
| WO | 2017172855 | 10/2017 |
| WO | 2017176682 | 10/2017 |
| WO | 2017176725 | 10/2017 |
| WO | 2017176729 | 10/2017 |
| WO | 2017189485 | 11/2017 |
| WO | 2017218909 | 12/2017 |
| WO | 2017218910 | 12/2017 |
| WO | 2017218912 | 12/2017 |
| WO | 2018/017450 | 1/2018 |
| WO | 2018009646 | 1/2018 |
| WO | 2018009798 | 1/2018 |
| WO | 2018017818 | 1/2018 |
| WO | 2018029502 | 2/2018 |
| WO | 2018226389 | 12/2018 |
| WO | 2018226649 | 12/2018 |
| WO | 2018226848 | 12/2018 |
| WO | 2018226857 | 12/2018 |
| WO | 2018226862 | 12/2018 |
| WO | 2018226906 | 12/2018 |

(56) References Cited

FOREIGN PATENT DOCUMENTS

| WO | 2018226981 | 12/2018 |
| WO | 2018226986 | 12/2018 |
| WO | 2019051086 | 3/2019 |
| WO | 2019151947 | 8/2019 |
| WO | 2020068446 | 4/2020 |
| WO | 2020068450 | 4/2020 |
| WO | 2020068469 | 4/2020 |
| WO | 2020068475 | 4/2020 |
| WO | 2020068502 | 4/2020 |
| WO | 2020068556 | 4/2020 |
| WO | 2020068641 | 4/2020 |
| WO | 2020068646 | 4/2020 |
| WO | 2020069107 | 4/2020 |

OTHER PUBLICATIONS

"Lamberet Smart Reefer on Solutrans", ZOEKEN, Jul. 28, 2015, 7 pages, available at: https://iepieleaks.nl/lamberet-smart-reefer-solutrans/.
U.S. Appl. No. 16/178,067, titled "Methods and Systems for Generation and Utilization of Supplemental Stored Energy for Use in Transport Climate Control", filed Nov. 1, 2018, 35 pages.
U.S. Appl. No. 16/565,063, titled "System and Method for Managing Power and Efficiently Sourcing a Variable Voltage for a Transport Climate Control System ", filed Sep. 9, 2019, 59 pages.
U.S. Appl. No. 16/574,754, titled "Methods and Systems for Energy Management of a Transport Climate Control System", filed Sep. 18, 2019, 50 pages.
U.S. Appl. No. 16/574,775, titled "Methods and Systems for Power and Load Management of a Transport Climate Control System", filed Sep. 18, 2019, 68 pages.
European Patent Application No. 18382672.6, titled "Methods and Systems for Energy Management of a Transport Climate Control System", filed Sep. 19, 2018, 50 pages.
European Patent Application No. 18382673.4 titled "Methods and Systems for Power and Load Management of a Transport Climate Control System", filed Sep. 19, 2018, 68 pages.
U.S. Appl. No. 16/176,802, titled "Methods and Systems for Controlling a Mild Hybrid System That Powers a Transport Climate Control System", filed Oct. 31, 2018, 31 pages.
U.S. Appl. No. 16/236,938, titled "Systems and Methods for Smart Load Shedding of a Transport Vehicle While in Transit", filed Dec. 31, 2018, 39 pages.
U.S. Appl. No. 16/176,720, titled "Methods and Systems for Augmenting a Vehicle Powered Transport Climate Control System", filed Oct. 31, 2018, 41 pages.
U.S. Appl. No. 16/176,602, titled "Reconfigurable Utility Power Input With Passive Voltage Booster", filed Oct. 31, 2018, 39 pages.
U.S. Appl. No. 16/147,704, titled "Methods and Systems for Monitoring and Displaying Energy Use and Energy Cost of a Transport Vehicle Climate Control System or a Fleet of Transport Vehicle Climate Control Systems", filed Sep. 29, 2018, 33 pages.
U.S. Appl. No. 16/235,865, titled "Methods and Systems for Preserving Autonomous Dperation of a Transport Climate Control System", filed Dec. 28, 2018, 41 pages.
PCT International Application No. PCT/US2018/068136, titled "Methods and Systems for Providing Predictive Energy Consumption Feedback for Powering a Transport Climate Control System", filed Dec. 31, 2018, 34 pages.
PCT International Application No. PCT/US2018/068129, titled "Methods and Systems for Notifying and Mitigating a Suboptimal Event Occurring in a Transport Climate Control System", filed Dec. 31, 2018, 44 pages.
PCT International Application No. PCT/US2018/068139, titled "Methods and Systems for Providing Feedback for a Transport Climate Control System", filed Dec. 31, 2018, 37 pages.
PCT International Application No. PCT/US2018/068142, titled "Methods and Systems for Providing Predictive Energy Consumption Feedback for Powering a Transport Climate Control System Using External Data", filed Dec. 31, 2018, 39 pages.
U.S. Appl. No. 16/911,692, titled "Climate Controlled Vehicle, Transport Climate Control Equipment, Method of Retrofitting a Vehicle and Method of Operation", filed Jun. 25, 2020, 39 pages.
U.S. Appl. No. 16/565,205, titled "Transport Climate Control System With an Accessory Power Distribution Unit for Managing Transport Climate Control Loads", filed Sep. 9, 2019, 57 pages.
U.S. Appl. No. 16/565,110, titled "Transport Climate Control System With a Selfdonfiguring Matrix Power Converter", filed Sep. 9, 2019, 52 pages.
U.S. Appl. No. 62/897,833, titled "Optimized Power Distribution To Transport Climate Control Systems Amongst One or More Electric Supply Equipment Stations ", filed Sep. 9, 2019, 41 pages.
European Patent Application No. 19382776.3, titled "Mprioritized Power Delivery for Facilitating Transport Climate Control", filed Sep. 9, 2019, 41 pages.
U.S. Appl. No. 16/565,282, titled "Optimized Power Cord for Transferring Power To a Transport Climate Control System ", filed Sep. 9, 2019, 43 pages.
U.S. Appl. No. 16/565,235, titled "Interface System for Connecting a Vehicle and a Transport Climate Control System", filed Sep. 9, 2019, 64 pages.
U.S. Appl. No. 16/565,252, titled "Demand-Side Power Distribution Management Fora Plurality of Transport Climate Control Systems", filed Sep. 9, 2019, 44 pages.
U.S. Appl. No. 17/015,190, titled "Optimized Power Distribution To Transport Climate Control Systems Amongst One or More Electric Supply Equipment Stations ", filed Sep. 9, 2020, 43 pages.
U.S. Appl. No. 16/147,708, titled "Methods and Systems for Autonomous Climate Control Optimization of a Transport Vehicle", filed Sep. 29, 2018, 41 pages.
U.S. Appl. No. 16/176,667, titled "Drive Off Protection System and Method for Preventing Drive Off", filed Oct. 31, 2018, 41 pages.
U.S. Appl. No. 16/730,126, titled "Transport Climate Control System Power Architecture", filed Dec. 30, 2019, 27 pages.
U.S. Appl. No. 17/015,194, titled "Prioritized Power Delivery for Facilitating Transport Climate Control", filed Sep. 9, 2020, 41 pages.
Extended European Search Report, issued in the corresponding European patent application No. 20195222.3, dated Jan. 26, 2021, 9 pages.

* cited by examiner

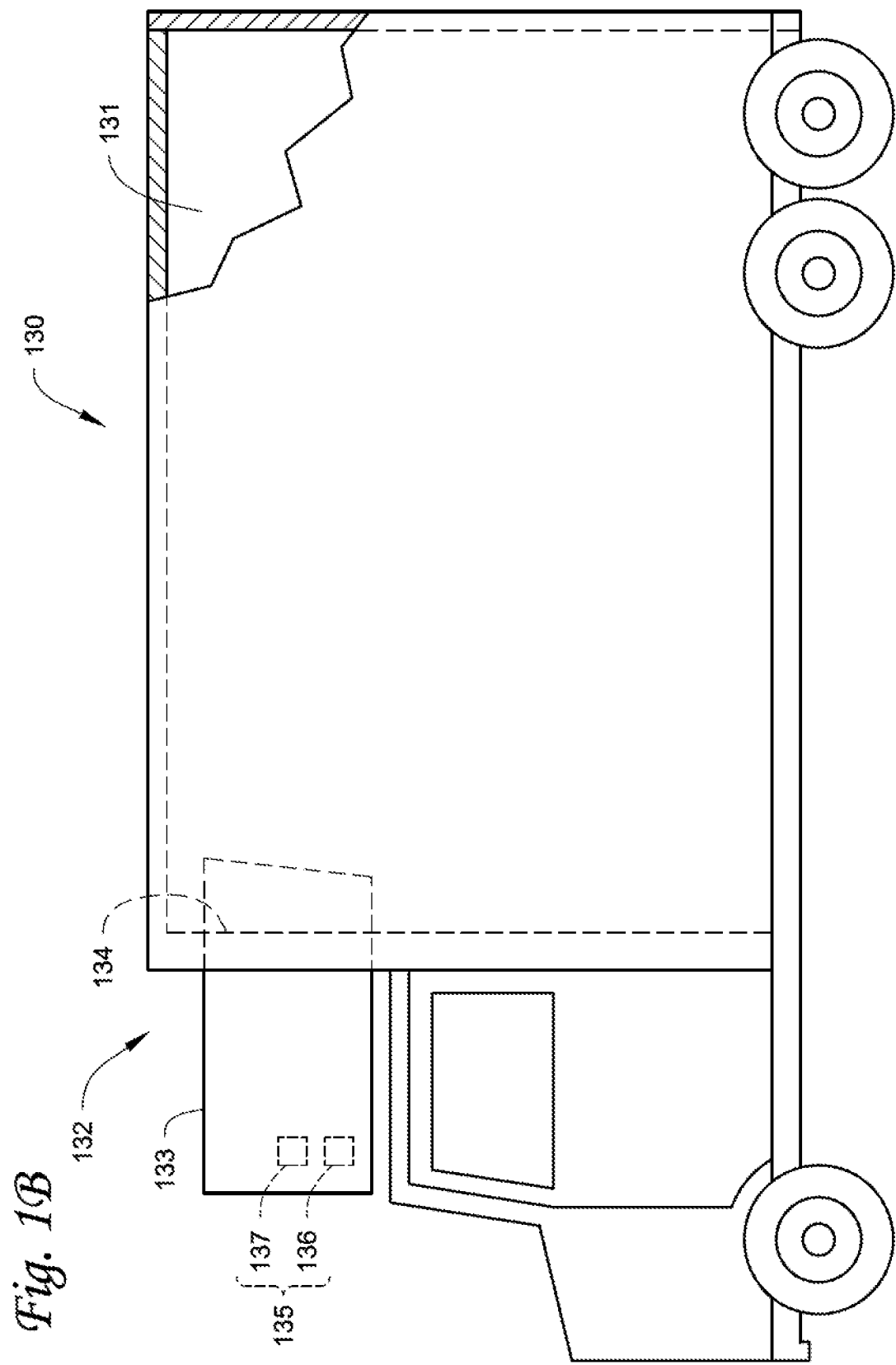

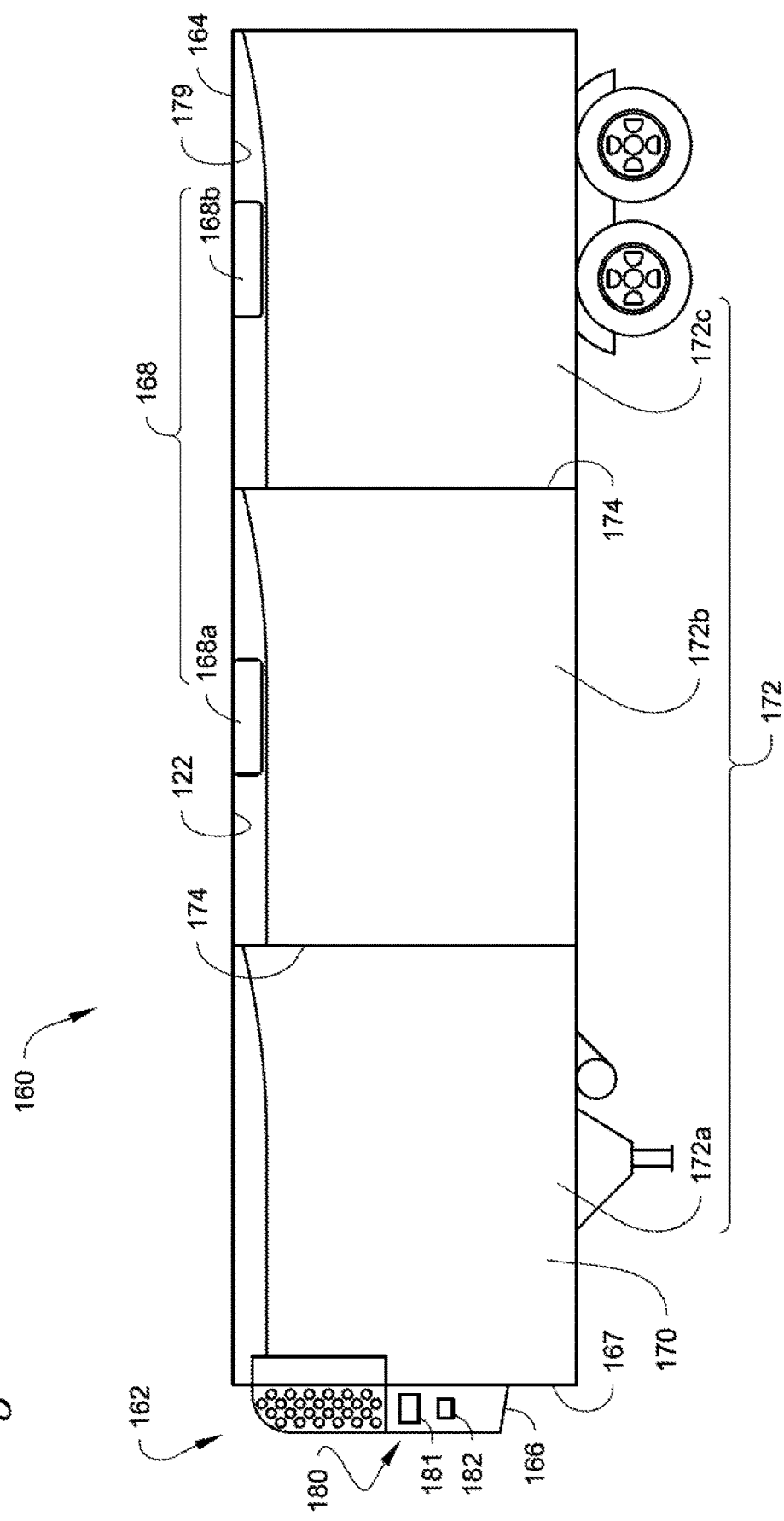

OPTIMIZED POWER MANAGEMENT FOR A TRANSPORT CLIMATE CONTROL ENERGY SOURCE

FIELD

The disclosure herein relates to an electrically powered accessory configured to be used with at least one of a vehicle, trailer and a transport container. More particularly, the disclosure herein relates to optimized power management to control charge and discharge of a rechargeable energy storage used for powering the electrically powered accessory.

BACKGROUND

A transport climate control system is generally used to control environmental condition(s) (e.g., temperature, humidity, air quality, and the like) within a climate controlled space of a transport unit (e.g., a truck, a container (such as a container on a flat car, an intermodal container, etc.), a box car, a semi-tractor, a bus, or other similar transport unit). The transport climate control system can include, for example, a transport refrigeration system (TRS) and/or a heating, ventilation and air conditioning (HVAC) system. The TRS can control environmental condition(s) within the climate controlled space to maintain cargo (e.g., produce, frozen foods, pharmaceuticals, etc.). The HVAC system can control environmental conditions(s) within the climate controlled space to provide passenger comfort for passengers travelling in the transport unit. In some transport units, the transport climate control system can be installed externally (e.g., on a rooftop of the transport unit, on a front wall of the transport unit, etc.).

In some embodiments, the transport climate control system can be a multi-zone transport climate control system (MTCS). The MTCS can be used to separately and independently control environmental condition(s) within each of the multiple zones of the climate controlled space. The MTCS can include a host unit, and one or more remote units that may be provided in different locations of the transport unit for separate climate control within each of the zones. In some instances, the MTCS can have two or more remote units without a host unit.

SUMMARY

The embodiments disclosed herein relate to an electrically powered accessory configured to be used with at least one of a vehicle, trailer and a transport container. More particularly, the embodiments disclosed herein relate to optimized power management to control charge and discharge of a rechargeable energy storage device used for powering the electrically powered accessory.

In particular, the embodiments described herein can integrate charging and discharging of a transport climate control rechargeable energy storage in a single circuit. Generally, the rechargeable energy storage has a lower voltage than a Direct Current ("DC") link voltage (either powered from a generator/alternator controlled regeneration or an external power source (e.g., a utility power source, a commercial charging station, etc.) controlled by a front end converter). The embodiments described herein can provide an optimized DC/DC converter between the rechargeable energy storage and the DC link that is configured to boost voltage and limit current in a discharge mode of the rechargeable energy storage and buck voltage in a charging mode.

The embodiments described herein can also provide an optimized power converter that can alternatively operate in a charge mode and a discharge mode using a single DC/DC converter circuit based on a status of the transport climate control system and available power source options. In particular, a controller can provide pulse width modulation (PWM) control of switches of the single DC/DC converter circuit to provide only a voltage boost (step-up) in one direction of the single DC/DC converter circuit and only a voltage buck (step-down) in an opposite direction of the single DC/DC converter circuit. Accordingly, a rechargeable energy storage connected to the single optimized DC/DC converter circuit can be used more flexibility as the rechargeable energy storage voltage can be matched to the DC link regardless of the voltage at the DC link. That is, the embodiments described herein can allow for a universal rechargeable energy storage that can operate at multiple voltage levels via the optimized power converter. During the charging mode, the controller can modify (e.g., buck) the voltage level of a power source using PWM control to match an operating/state of charge voltage level of the rechargeable energy storage. During the discharge mode, the controller can modify (e.g., boost) the voltage level of the rechargeable energy storage using PWM control to match the voltage level at the DC link.

In one embodiment, an optimized power converter for use in a transport electrical system that provides power to a transport climate control system is provided. The optimized power converter includes an optimized DC/DC converter and an inverter/active rectifier. The optimized DC/DC converter is connected between a rechargeable energy storage of the transport electrical system that provides DC power and the inverter/active rectifier. The optimized DC/DC converter is configured to only boost a voltage level when current is directed from the rechargeable energy storage to the inverter/active rectifier and is configured to only buck a voltage level when current is directed from the inverter/active rectifier to the rechargeable energy storage. The inverter/active rectifier is connected to the optimized DC/DC converter. The optimized power converter is configured to operate in a charging mode and a discharge mode. When the optimized power converter is operating in the charging mode, the inverter/active rectifier is configured to convert three phase Alternating Current ("AC") power into DC power, and the optimized power converter is configured to buck the DC power to a voltage level that is acceptable for charging the rechargeable energy storage. When the optimized power converter is operating in the discharge mode, the optimized DC/DC converter is configured to boost voltage from the rechargeable energy storage, and the inverter/active rectifier is configured to convert boosted DC power into three phase AC power for powering one or more AC loads of the transport climate control system.

In another embodiment, a transport electrical system for powering a transport climate control system is provided. The transport electrical system includes a transport climate control load network and an optimized power converter. The transport climate control load network includes a plurality of transport climate control loads that use power to operate the transport climate control system. The optimized power converter provides power to one or more transport climate control loads of the transport climate control load network. The optimized power converter includes an optimized DC/DC converter and an inverter/active rectifier. The optimized DC/DC converter is connected between a rechargeable energy storage of the transport electrical system that provides DC power and an inverter/active rectifier. The optimized DC/DC converter is configured to only boost a voltage level when current is directed from the rechargeable energy storage to the inverter/active rectifier and is configured to only buck a voltage level when current is directed from the inverter/active rectifier to the rechargeable energy storage. The inverter/active rectifier is connected to the optimized DC/DC converter. The optimized power converter is configured to operate in a charging mode and a discharge mode. When the optimized power converter is operating in the charging mode, the inverter/active rectifier is configured to convert three phase AC power into DC power, and the optimized power converter is configured to buck the DC power to a voltage level that is acceptable for charging the rechargeable energy storage. When the optimized power converter is operating in the discharge mode, the optimized DC/DC converter is configured to boost voltage from the rechargeable energy storage, and the inverter/active rectifier is configured to convert boosted DC power into three phase AC power for powering the one or more transport climate control loads.

In yet another embodiment, an optimized power converter for use in a transport electrical system that provides power to an electrically powered accessory is provided. The optimized power converter includes an optimized DC/DC converter and an inverter/active rectifier. The optimized DC/DC converter is connected between a rechargeable energy storage of the transport electrical system that provides DC power and the inverter/active rectifier. The optimized DC/DC converter is configured to only boost a voltage level when current is directed from the rechargeable energy storage to the inverter/active rectifier and is configured to only buck a voltage level when current is directed from the inverter/active rectifier to the rechargeable energy storage. The inverter/active rectifier is connected to the optimized DC/DC converter. The optimized power converter is configured to operate in a charging mode and a discharge mode. When the optimized power converter is operating in the charging mode, the inverter/active rectifier is configured to convert three phase AC power into DC power, and the optimized power converter is configured to buck the DC power to a voltage level that is acceptable for charging the rechargeable energy storage. When the optimized power converter is operating in the discharge mode, the optimized DC/DC converter is configured to boost voltage from the rechargeable energy storage, and the inverter/active rectifier is configured to convert boosted DC power into three phase AC power for powering one or more AC loads of the electrically powered accessory.

In a further embodiment, a transport electrical system for powering an electrically powered accessory is provided. The transport electrical system includes an electrically powered accessory load network and an optimized power converter. The electrically powered accessory load network includes a plurality of electrically powered accessory loads that use power to operate the electrically powered accessory. The optimized power converter provides power to one or more electrically powered accessory loads of the electrically powered accessory load network. The optimized power converter includes an optimized DC/DC converter and an inverter/active rectifier. The optimized DC/DC converter is connected between a rechargeable energy storage of the transport electrical system that provides DC power and an inverter/active rectifier. The optimized DC/DC converter is configured to only boost a voltage level when current is directed from the rechargeable energy storage to the inverter/active rectifier and is configured to only buck a voltage level when current is directed from the inverter/ active rectifier to the rechargeable energy storage. The inverter/active rectifier is connected to the optimized DC/DC converter. The optimized power converter is configured to operate in a charging mode and a discharge mode. When the optimized power converter is operating in the charging mode, the inverter/active rectifier is configured to convert three phase AC power into DC power, and the optimized power converter is configured to buck the DC power to a voltage level that is acceptable for charging the rechargeable energy storage. When the optimized power converter is operating in the discharge mode, the optimized DC/DC converter is configured to boost voltage from the rechargeable energy storage, and the inverter/active rectifier is configured to convert boosted DC power into three phase AC power for powering the one or more electrically powered accessory loads.

Other features and aspects will become apparent by consideration of the following detailed description and accompanying drawings.

BRIEF DESCRIPTION OF THE DRAWINGS

FIG. 1B illustrates a side view of a truck with a transport climate control system, according to one embodiment.

FIG. 1D illustrates a side view of a climate controlled transport unit with a multi-zone transport climate control system, according to one embodiment.

Like reference numbers represent like parts throughout.

DETAILED DESCRIPTION

The embodiments disclosed herein relate to an electrically powered accessory configured to be used with at least one of a vehicle, trailer and a transport container. More particularly, the embodiments disclosed herein relate to a system and method of energy efficient operation of an electrically powered accessory.

It is noted that: U.S. application Ser. No. 16/565,063, "SYSTEM AND METHOD FOR MANAGING POWER AND EFFICIENTLY SOURCING A VARIABLE VOLTAGE FOR A TRANSPORT CLIMATE CONTROL SYSTEM,"; U.S. application Ser. No. 16/565,110, "TRANSPORT CLIMATE CONTROL SYSTEM WITH A SELF-CONFIGURING MATRIX POWER CONVERTER,"; U.S. Provisional Application No. 62/897,833, "OPTIMIZED POWER DISTRIBUTION TO TRANSPORT CLIMATE CONTROL SYSTEMS AMONGST ONE OR MORE ELECTRIC SUPPLY EQUIPMENT STATIONS,"; European Patent Application Number 19382776.3, "PRIORI- TIZED POWER DELIVERY FOR FACILITATING TRANSPORT CLIMATE CONTROL,"; U.S. application Ser. No. 16/565,205, "TRANSPORT CLIMATE CONTROL SYSTEM WITH AN ACCESSORY POWER DISTRIBUTION UNIT FOR MANAGING TRANSPORT CLIMATE CONTROL ELECTRICALLY POWERED ACCESSORY LOADS,"; U.S. application Ser. No. 16/565,235, "AN INTERFACE SYSTEM FOR CONNECTING A VEHICLE AND A TRANSPORT CLIMATE CONTROL SYSTEM,"; U.S. application Ser. No. 16/565,252, "DEMAND-SIDE POWER DISTRIBUTION MANAGEMENT FOR A PLURALITY OF TRANSPORT CLIMATE CONTROL SYSTEMS,"; and U.S. application Ser. No. 16/565,282, "OPTIMIZED POWER CORD FOR TRANSFERRING POWER TO A TRANSPORT CLIMATE CONTROL SYSTEM,"; all filed concurrently herewith on Sep. 9, 2019, and the contents of which are incorporated herein by reference.

While the embodiments described below illustrate different embodiments of a transport climate control system, it will be appreciated that the electrically powered accessory is not limited to the transport climate control system or a climate control unit (CCU) of the transport climate control system. It will be appreciated that a CCU can be e.g., a transport refrigeration unit (TRU). In other embodiments, the electrically powered accessory can be, for example, a crane attached to a vehicle, a cement mixer attached to a truck, one or more food appliances of a food truck, a boom arm attached to a vehicle, a concrete pumping truck, a refuse truck, a fire truck (with a power driven ladder, pumps, lights, etc.), etc. It will be appreciated that the electrically powered accessory may require continuous operation even when the vehicle's ignition is turned off and/or the vehicle is parked and/or idling and/or charging. The electrically powered accessory can require substantial power to operate and/or continuous and/or autonomous operation (e.g., controlling temperature/humidity/airflow of a climate controlled space) on an as needed basis, independent of the vehicle's operational mode.

Figure 1A:
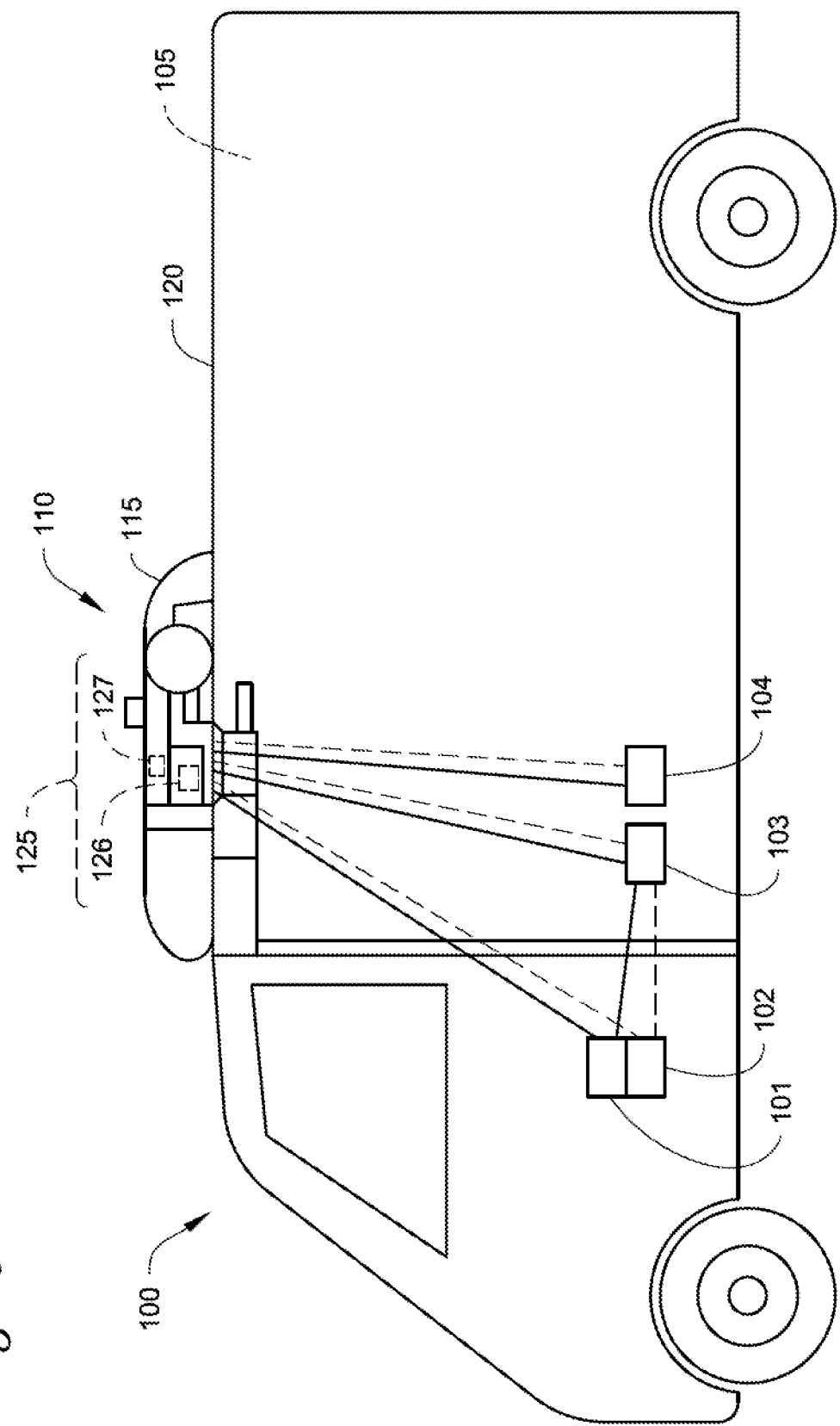
FIG. 1A illustrates a side view of a van with a transport climate control system, according to one embodiment.

FIG. 1A depicts a climate-controlled van 100 that includes a climate controlled space 105 for carrying cargo and a transport climate control system 110 for providing climate control within the climate controlled space 105. The transport climate control system 110 includes a climate control unit (CCU) 115 that is mounted to a rooftop 120 of the van 100. The transport climate control system 110 can include, amongst other components, a climate control circuit (not shown) that connects, for example, a compressor, a condenser, an evaporator and an expansion device to provide climate control within the climate controlled space 105. It will be appreciated that the embodiments described herein are not limited to climate-controlled vans, but can apply to any type of transport unit (e.g., a truck, a container (such as a container on a flat car, an intermodal container, a marine container, etc.), a box car, a semi-tractor, a bus, or other similar transport unit), etc.

The transport climate control system 110 also includes a programmable climate controller 125 and one or more sensors (not shown) that are configured to measure one or more parameters of the transport climate control system 110 (e.g., an ambient temperature outside of the van 100, an ambient humidity outside of the van 100, a compressor suction pressure, a compressor discharge pressure, a supply air temperature of air supplied by the CCU 115 into the climate controlled space 105, a return air temperature of air returned from the climate controlled space 105 back to the CCU 115, a humidity within the climate controlled space 105, etc.) and communicate parameter data to the climate controller 125. The climate controller 125 is configured to control operation of the transport climate control system 110 including the components of the climate control circuit. The climate controller unit 115 may comprise a single integrated control unit 126 or may comprise a distributed network of climate controller elements 126, 127. The number of distributed control elements in a given network can depend upon the particular application of the principles described herein.

The climate-controlled van 100 can also include a vehicle PDU 101, a VES 102, a standard charging port 103, and/or an enhanced charging port 104. The VES 102 can include a controller (not shown). The vehicle PDU 101 can include a controller (not shown). In one embodiment, the vehicle PDU controller can be a part of the VES controller or vice versa. In one embodiment, power can be distributed from e.g., an electric vehicle supply equipment (EVSE, not shown), via the standard charging port 103, to the vehicle PDU 101. Power can also be distributed from the vehicle PDU 101 to an electrical supply equipment (ESE, not shown) and/or to the CCU 115 (see solid lines for power lines and dotted lines for communication lines). In another embodiment, power can be distributed from e.g., an EVSE (not shown), via the enhanced charging port 104, to an ESE (not shown) and/or to the CCU 115. The ESE can then distribute power to the vehicle PDU 101 via the standard charging port 103.

FIG. 1B depicts a climate-controlled straight truck 130 that includes a climate controlled space 131 for carrying cargo and a transport climate control system 132. The transport climate control system 132 includes a CCU 133 that is mounted to a front wall 134 of the climate controlled space 131. The CCU 133 can include, amongst other components, a climate control circuit (not shown) that connects, for example, a compressor, a condenser, an evaporator and an expansion device to provide climate control within the climate controlled space 131.

The transport climate control system 132 also includes a programmable climate controller 135 and one or more sensors (not shown) that are configured to measure one or more parameters of the transport climate control system 132 (e.g., an ambient temperature outside of the truck 130, an ambient humidity outside of the truck 130, a compressor suction pressure, a compressor discharge pressure, a supply air temperature of air supplied by the CCU 133 into the climate controlled space 131, a return air temperature of air returned from the climate controlled space 131 back to the CCU 133, a humidity within the climate controlled space 131, etc.) and communicate parameter data to the climate controller 135. The climate controller 135 is configured to control operation of the transport climate control system 132 including components of the climate control circuit. The climate controller 135 may comprise a single integrated control unit 136 or may comprise a distributed network of climate controller elements 136, 137. The number of distributed control elements in a given network can depend upon the particular application of the principles described herein.

It will be appreciated that similar to the climate-controlled van 100 shown in FIG. 1A, the climate-controlled straight truck 130 of FIG. 1B can also include a vehicle PDU (such as the vehicle PDU 101 shown in FIG. 1A), a VES (such as the VES 102 shown in FIG. 1A), a standard charging port (such as the standard charging port 103 shown in FIG. 1A), and/or an enhanced charging port (e.g., the enhanced charging port 104 shown in FIG. 1A), communicating with and distribute power from/to the corresponding ESE and/or the CCU 133.

Figure 1C:
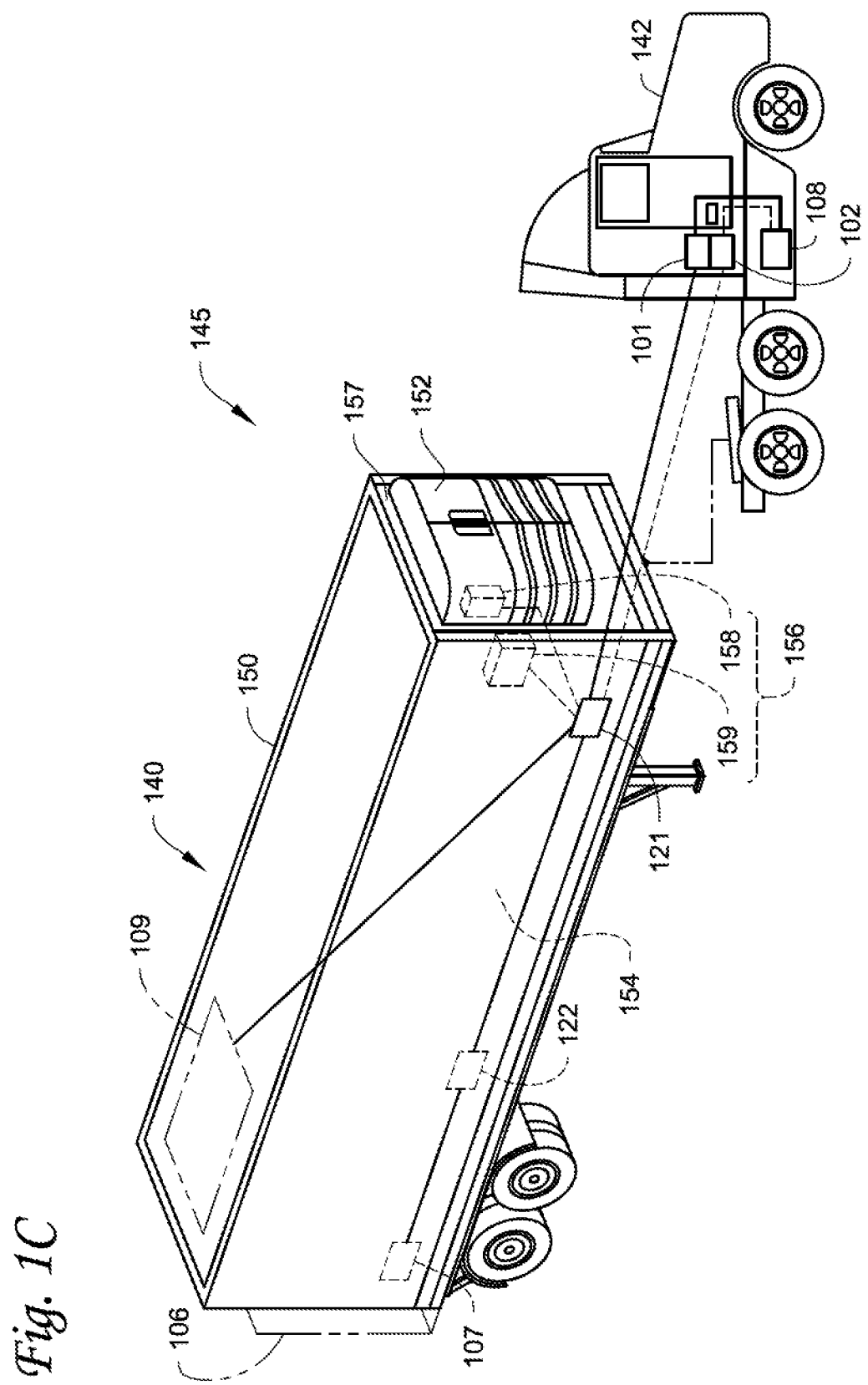
FIG. 1C illustrates a perspective view of a climate controlled transport unit, with a transport climate control system, attached to a tractor, according to one embodiment.

FIG. 1C illustrates one embodiment of a climate controlled transport unit 140 attached to a tractor 142. The climate controlled transport unit 140 includes a transport climate control system 145 for a transport unit 150. The tractor 142 is attached to and is configured to tow the transport unit 150. The transport unit 150 shown in FIG. 1C is a trailer.

The transport climate control system 145 includes a CCU 152 that provides environmental control (e.g. temperature, humidity, air quality, etc.) within a climate controlled space 154 of the transport unit 150. The CCU 152 is disposed on a front wall 157 of the transport unit 150. In other embodiments, it will be appreciated that the CCU 152 can be disposed, for example, on a rooftop or another wall of the transport unit 150. The CCU 152 includes a climate control circuit (not shown) that connects, for example, a compressor, a condenser, an evaporator and an expansion device to provide conditioned air within the climate controlled space 154.

The transport climate control system 145 also includes a programmable climate controller 156 and one or more sensors (not shown) that are configured to measure one or more parameters of the transport climate control system 145 (e.g., an ambient temperature outside of the transport unit 150, an ambient humidity outside of the transport unit 150, a compressor suction pressure, a compressor discharge pressure, a supply air temperature of air supplied by the CCU 152 into the climate controlled space 154, a return air temperature of air returned from the climate controlled space 154 back to the CCU 152, a humidity within the climate controlled space 154, etc.) and communicate parameter data to the climate controller 156. The climate controller 156 is configured to control operation of the transport climate control system 145 including components of the climate control circuit. The climate controller 156 may comprise a single integrated control unit 158 or may comprise a distributed network of climate controller elements 158, 159. The number of distributed control elements in a given network can depend upon the particular application of the principles described herein.

In some embodiments, the tractor 142 can include an optional APU 108. The optional APU 108 can be an electric auxiliary power unit (eAPU). Also, in some embodiments, the tractor 142 can also include a vehicle PDU 101 and a VES 102 (not shown). The APU 108 can provide power to the vehicle PDU 101 for distribution. It will be appreciated that for the connections, solid lines represent power lines and dotted lines represent communication lines. The climate controlled transport unit 140 can include a PDU 121 connecting to power sources (including, for example, an optional solar power source 109; an optional power source 122 such as Genset, fuel cell, undermount power unit, auxiliary battery pack, etc.; and/or an optional liftgate battery 107, etc.) of the climate controlled transport unit 140. The PDU 121 can include a PDU controller (not shown). The PDU controller can be a part of the climate controller 156. The PDU 121 can distribute power from the power sources of the climate controlled transport unit 140 to e.g., the transport climate control system 145. The climate controlled transport unit 140 can also include an optional liftgate 106. The optional liftgate battery 107 can provide power to open and/or close the liftgate 106.

It will be appreciated that similar to the climate-controlled van 100, the climate controlled transport unit 140 attached to the tractor 142 of FIG. 1C can also include a VES (such as the VES 102 shown in FIG. 1A), a standard charging port (such as the standard charging port 103 shown in FIG. 1A), and/or an enhanced charging port (such as the enhanced charging port 104 shown in FIG. 1A), communicating with and distribute power from/to a corresponding ESE and/or the CCU 152. It will be appreciated that the charging port(s) 103 and/or can be on either the tractor 142 or the trailer. For example, in one embodiment, the standard charging port 103 is on the tractor 142 and the enhanced charging port 104 is on the trailer.

FIG. 1D illustrates another embodiment of a climate controlled transport unit 160. The climate controlled transport unit 160 includes a multi-zone transport climate control system (MTCS) 162 for a transport unit 164 that can be towed, for example, by a tractor (not shown). It will be appreciated that the embodiments described herein are not limited to tractor and trailer units, but can apply to any type of transport unit (e.g., a truck, a container (such as a container on a flat car, an intermodal container, a marine container, etc.), a box car, a semi-tractor, a bus, or other similar transport unit), etc.

The MTCS 162 includes a CCU 166 and a plurality of remote units 168 that provide environmental control (e.g. temperature, humidity, air quality, etc.) within a climate controlled space 170 of the transport unit 164. The climate controlled space 170 can be divided into a plurality of zones 172. The term "zone" means a part of an area of the climate controlled space 170 separated by walls 174. The CCU 166 can operate as a host unit and provide climate control within a first zone 172a of the climate controlled space 166. The remote unit 168a can provide climate control within a second zone 172b of the climate controlled space 170. The remote unit 168b can provide climate control within a third zone 172c of the climate controlled space 170. Accordingly, the MTCS 162 can be used to separately and independently control environmental condition(s) within each of the multiple zones 172 of the climate controlled space 162.

The CCU 166 is disposed on a front wall 167 of the transport unit 160. In other embodiments, it will be appreciated that the CCU 166 can be disposed, for example, on a rooftop or another wall of the transport unit 160. The CCU 166 includes a climate control circuit (not shown) that connects, for example, a compressor, a condenser, an evaporator and an expansion device to provide conditioned air within the climate controlled space 170. The remote unit 168a is disposed on a ceiling 179 within the second zone 172b and the remote unit 168b is disposed on the ceiling 179 within the third zone 172c. Each of the remote units 168a,b include an evaporator (not shown) that connects to the rest of the climate control circuit provided in the CCU 166.

The MTCS 162 also includes a programmable climate controller 180 and one or more sensors (not shown) that are configured to measure one or more parameters of the MTCS 162 (e.g., an ambient temperature outside of the transport unit 164, an ambient humidity outside of the transport unit 164, a compressor suction pressure, a compressor discharge pressure, supply air temperatures of air supplied by the CCU 166 and the remote units 168 into each of the zones 172, return air temperatures of air returned from each of the zones 172 back to the respective CCU 166 or remote unit 168a or 168b, a humidity within each of the zones 118, etc.) and communicate parameter data to a climate controller 180. The climate controller 180 is configured to control operation of the MTCS 162 including components of the climate control circuit. The climate controller 180 may comprise a single integrated control unit 181 or may comprise a distributed network of climate controller elements 181, 182. The number of distributed control elements in a given network can depend upon the particular application of the principles described herein.

It will be appreciated that similar to the climate-controlled van 100, the climate controlled transport unit 160 of FIG. 1D can also include a vehicle PDU (such as the vehicle PDU 101 shown in FIG. 1A), a VES (such as the VES 102 shown in FIG. 1A), a standard charging port (such as the standard charging port 103 shown in FIG. 1A), and/or an enhanced charging port (e.g., the enhanced charging port 104 shown in FIG. 1A), communicating with and distribute power from/to the corresponding ESE and/or the CCU 166.

Figure 1E:
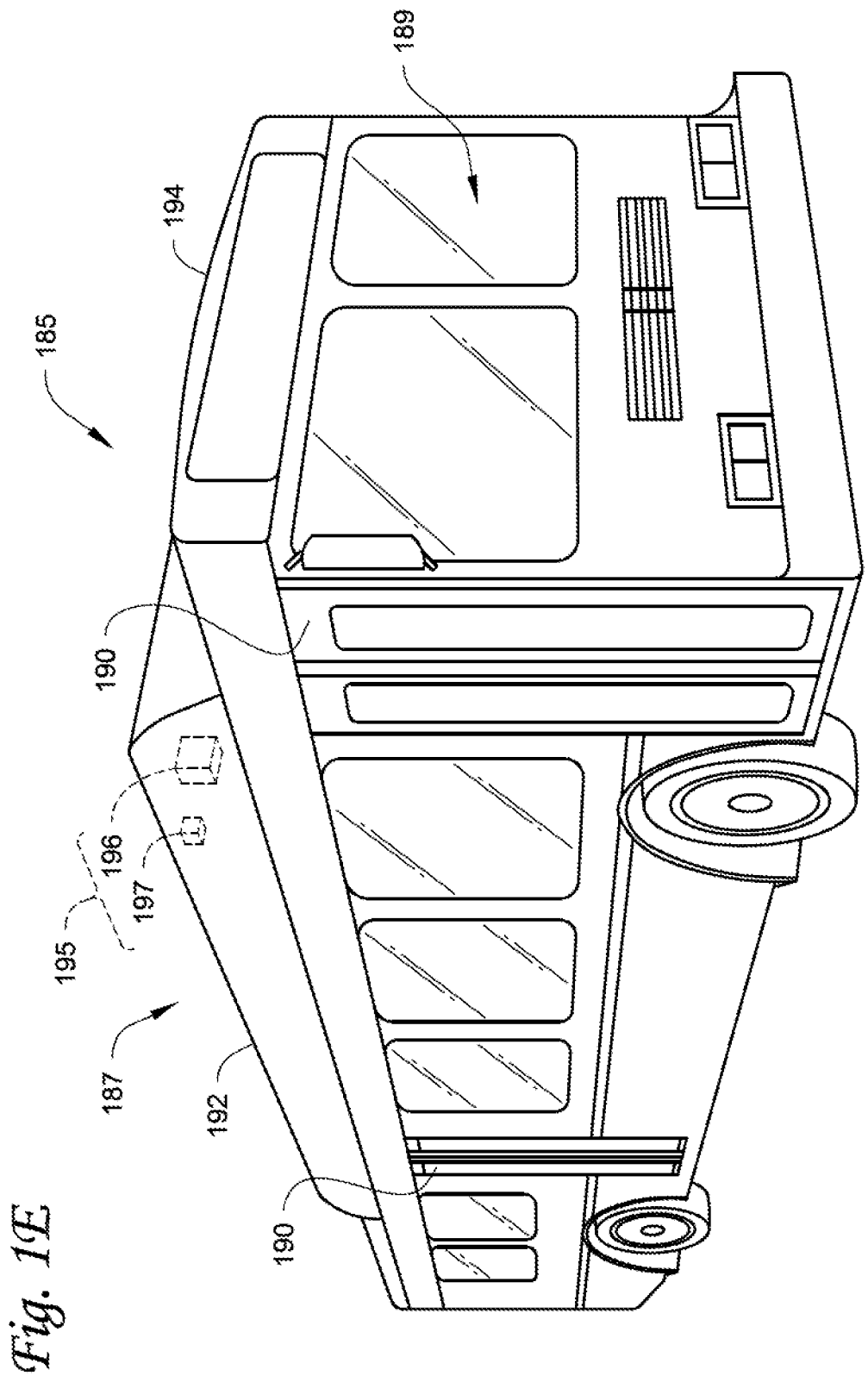
FIG. 1E illustrates a perspective view of a mass-transit vehicle including a transport climate control system, according to one embodiment.

FIG. 1E is a perspective view of a vehicle 185 including a transport climate control system 187, according to one embodiment. The vehicle 185 is a mass-transit bus that can carry passenger(s) (not shown) to one or more destinations. In other embodiments, the vehicle 185 can be a school bus, railway vehicle, subway car, or other commercial vehicle that carries passengers. The vehicle 185 includes a climate controlled space (e.g., passenger compartment) 189 supported that can accommodate a plurality of passengers. The vehicle 185 includes doors 190 that are positioned on a side of the vehicle 185. In the embodiment shown in FIG. 1E, a first door 190 is located adjacent to a forward end of the vehicle 185, and a second door 190 is positioned towards a rearward end of the vehicle 185. Each door 190 is movable between an open position and a closed position to selectively allow access to the climate controlled space 189. The transport climate control system 187 includes a CCU 192 attached to a roof 194 of the vehicle 185.

The CCU 192 includes a climate control circuit (not shown) that connects, for example, a compressor, a condenser, an evaporator and an expansion device to provide conditioned air within the climate controlled space 189. The transport climate control system 187 also includes a programmable climate controller 195 and one or more sensors (not shown) that are configured to measure one or more parameters of the transport climate control system 187 (e.g., an ambient temperature outside of the vehicle 185, a space temperature within the climate controlled space 189, an ambient humidity outside of the vehicle 185, a space humidity within the climate controlled space 189, etc.) and communicate parameter data to the climate controller 195. The climate controller 195 is configured to control operation of the transport climate control system 187 including components of the climate control circuit. The climate controller 195 may comprise a single integrated control unit 196 or may comprise a distributed network of climate controller elements 196, 197. The number of distributed control elements in a given network can depend upon the particular application of the principles described herein.

It will be appreciated that similar to the climate-controlled van 100, the vehicle 185 including a transport climate control system 187 of FIG. 1E can also include a vehicle PDU (such as the vehicle PDU 101 shown in FIG. 1A), a VES (such as the VES 102 shown in FIG. 1A), a standard charging port (such as the standard charging port 103 shown in FIG. 1A), and/or an enhanced charging port (e.g., the enhanced charging port 104 shown in FIG. 1A), communicating with and distribute power from/to the corresponding ESE and/or the CCU 192.

Figure 2:
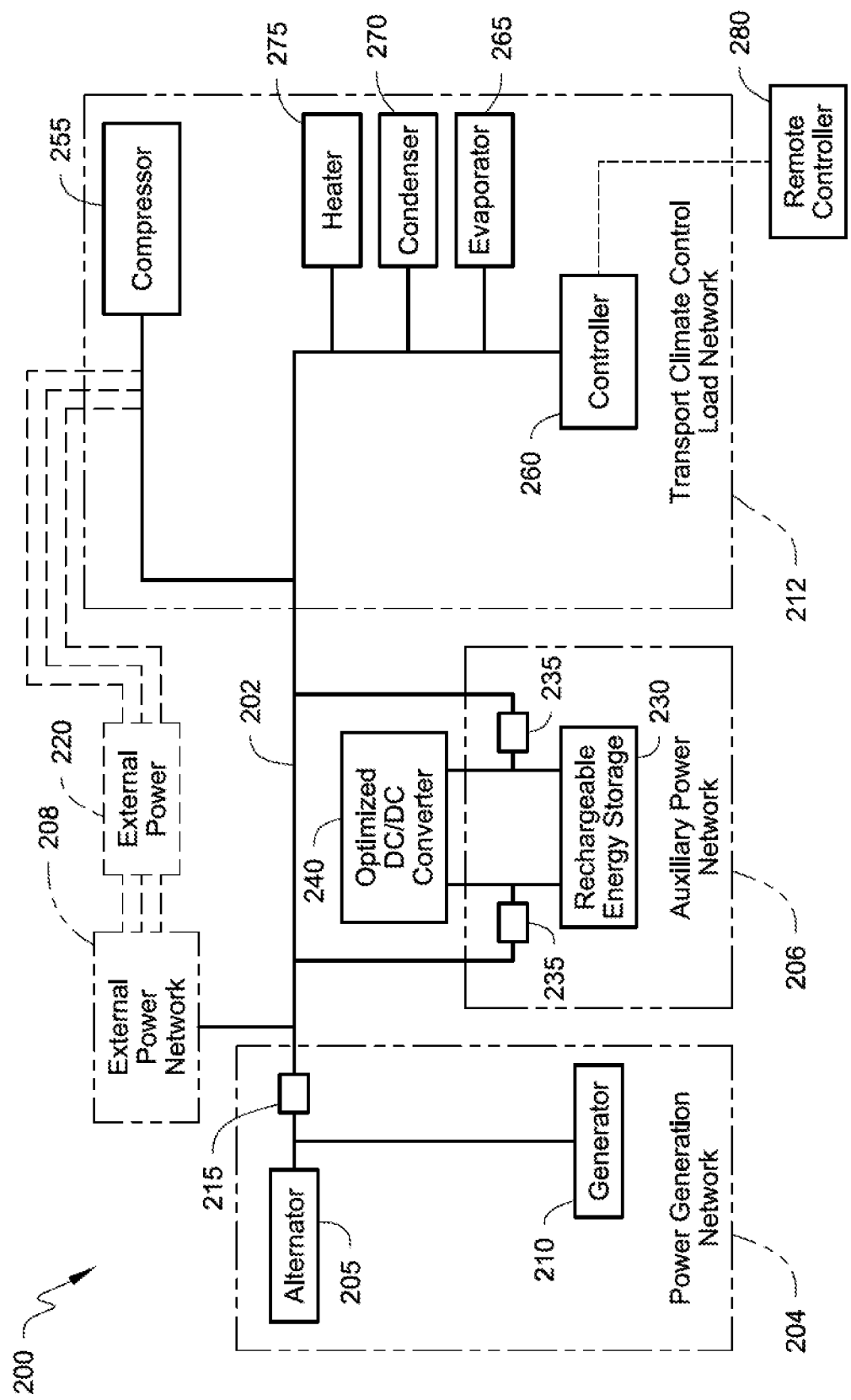
FIG. 2 illustrates a block diagram schematic of a transport electrical system for powering a transport climate control system, according to one embodiment.

FIG. 2 illustrates a block diagram schematic of one embodiment of a transport electrical system 200 for powering a transport climate control system (e.g., the transport climate control system 110, 132, 145, 162 and 187 shown in FIGS. 1A-E). The transport electrical system 200 can be provided, for example, in a CCU (e.g., the CCU 115, 133, 152, 166 and 192 shown in FIGS. 1A-E) to supply electrical power to the CCU. The transport electrical system 200 shown in FIG. 2 is configured to operate with a prime mover powered vehicle. However, it will be appreciated that the transport electrical system 200 can also be configured to operate with an electric vehicle powered by an energy storage device (e.g., one or more batteries) and/or a hybrid vehicle powered by a combination of a prime mover and an energy storage device.

As shown in FIG. 2, the transport electrical system 200 includes a power bus 202 electrically connecting a power generation network 204, an auxiliary power network 206, an external power network 208, an optimized power converter 240 and a transport climate control load network 212. It will be appreciated that "regulated" is a term of art. For example, a regulated power supply can convert unregulated AC supply into a constant DC, with the help of a rectifier (or an AC-DC converter, or the like), and can supply a stable voltage (or current in some situations), to a circuit or device that need to be operated within certain power supply limits.

The transport electrical system 200 can manage and regulate energy from one or more energy sources from the power generation network 204, the auxiliary power network 206 and/or the external power network 208 to the transport climate control load network 212 via the optimized power converter 240. The one or more energy sources can include a generator 210 and an alternator 205 via the power generation network 204, an external power 220 (e.g., a utility or shore power source, a commercial charging station, etc.) via the external power network 208, a rechargeable energy storage 230 via the auxiliary power network 206. Also, the transport electrical system 200 is configured to supply energy to one or more loads from the transport climate control load network 212. The loads can be, for example, a compressor 255, one or more evaporator blowers 265, one or more condenser fans 270, a heater 275, and a controller 260 of a transport climate control system.

The power generation network 204 includes the generator 210, the alternator 205 and an isolator switch 215 disposed between the alternator 205 and the generator 210 at one end and the power bus 202 at a second end. In some embodiments, the generator 210 can also be used to power components of the transport climate control load network 208. The generator 210 and the alternator 205 are connected to the power bus 202 via the isolator switch 215. In one embodiment, the isolator switch 215 can be a switch controlled by the controller 260 that isolates the optimized power converter 240 from receiving energy from the power generation network 204.

The alternator 205 can be an electrical alternator that can provide AC power to the vehicle. In some embodiments, the alternator 205 can include a rectifier or an AC-DC converter (not shown) that rectifies or converts the AC power to a DC power. The alternator 205 is connected to the power bus 202 via the isolator switch 215.

It will be appreciated that any type of power source can provide power to the transport electrical system 200 can be part of the power generation network 204. This can include, for example, the alternator 205, the generator 210, a RESS, a generator, an axle-mounted generator, a power take off (PTO) device or ePTO device with an auxiliary converter, etc.

In some embodiments, a voltage sensor (not shown) can be provided in the power generation network 204 to monitor a voltage provided to the power bus 202. Also, in some embodiments, a current sensor (not shown) can be provided in series with the isolator switch 215 to monitor the current to and from the auxiliary power network 206.

The external power network 208 includes an external power (e.g., utility power, commercial charging power, etc.) 220 that can provide AC power to the power bus 202.

The auxiliary power network 206 includes the rechargeable energy storage 230 and two auxiliary power on/off switches 235 disposed between the rechargeable energy storage 230 and the power bus 202. In some embodiments, the auxiliary power network 206 can be part of the transport climate control system and potentially housed within a transport refrigeration unit. In other embodiments, the auxiliary power network 206 can be external to the transport climate control system and part of the power generation network 204. In yet some other embodiments, the auxiliary power network 206 can be external to the transport climate control system and external to the power generation network 204.

In some embodiments, the rechargeable energy storage 230 can include one or more rechargeable batteries (also referred to as hold-over batteries). For example, in one embodiment the rechargeable energy storage 230 can include two auxiliary batteries (not shown). Each of the auxiliary batteries can also be connected to the power bus 202 via the optimized power converter 240. Also, each of the auxiliary batteries can bypass the optimized power converter 240 and connect to the power bus 202 via one of the auxiliary power on/off switches 235. It will be appreciated that the rechargeable energy storage 230 can provide sufficient energy to power the transport climate control load network 212 by itself. Each of the auxiliary power on/off switches 235 can be controlled by the controller 260. In some embodiments, the rechargeable energy storage 230 can be a battery pack.

The optimized power converter 240 is configured to transfer power from one of the power generation network 204, the external power network 208 and/or the auxiliary power network 206 to the transport climate control load network 212. In some embodiments, the optimized power converter 240 can be part of an energy management module (e.g., a smart charge module (SCM), etc.). In these embodiments, the optimized power converter 240 can transfer power from the power generation network 204 and/or the external power network 208 to charge one or more rechargeable batteries of the rechargeable energy storage 230. Thus, the optimized power converter 240 can control current flow along the power bus 202. In some embodiments, the transport electrical system 200 can include two or more optimized power converters 240 each of which is part of a separate SMC. The optimized power converter 240 is configured to only step-down (buck) voltage of power being sent from the power generation network 204 and/or the external power network 208 to the optimized power converter 240, and is configured to only step-up (boost) voltage of power from the optimized power converter 240 to various AC load (e.g., the compressor 255, the heater 275, the condenser fans 270, the evaporator fans 265, the controller 260, etc.). Accordingly, the optimized power converter 240 can control current direction and current amount along the bus 202. The optimized power converter 240 is described in further detail with respect to FIGS. 3A-4C.

The transport electrical system 200, and particularly the optimized power converter 240, is controlled by the controller 260. The controller 260 can be, for example, the TRS controller 15 shown in FIG. 1A, the MTRS controller 170 of FIG. 1B, or the APU controller 41. A remote controller 280 can be connected to the controller 260 wirelessly (e.g., Bluetooth, ZigBee, etc.) or via wire (e.g., a communication link such as a RS485 communication link). The remote controller 280 can be located in a cab of the vehicle and can be controlled by a user, for example, a driver. The remote controller 280 can be used by a user to communicate the user's settings for components of the transport climate control load network 212 to the controller 260.

Components of the transport climate control load network 212 can be, for example, part of a TRU that is mounted to the body of the vehicle (for example, truck). In some embodiments, the TRU can be above the cab of the truck. In another embodiment, the TRU can be on the top of the TU (for example, a top of a box where the external condensers are located). The transport climate control load network 212 includes a compressor 255, one or more evaporator blowers 265, one or more condenser fans 270, the heater 275, and the controller 260. The power bus 202 is connected to and powers each of the compressor 255, the one or more evaporator blowers 265, the one or more condenser fans 270, the heater 275, and the controller 260.

In some embodiments, the compressor 255 can be a variable speed compressor. In some embodiments, the compressor 255 can require, for example, 1 KW of power to operate. In some embodiments, the one or more evaporator blowers 265 can require, for example, 100 W of power to operate. In some embodiments, the one or more condenser fans 270 can require, for example, 130 W of power to operate. In some embodiments, the heater 275 can require, for example, 1200 W of power to operate.

When the compressor 255 and/or the heater 275 are powered directly by the external power 220, the compressor 255 and/or the heater 275 can be turned on and off (e.g., operate in a cycle sentry mode) in order to control the amount of cooling provided by the compressor 255 and/or the amount of heating provided by the heater 275.

Figure 3A:
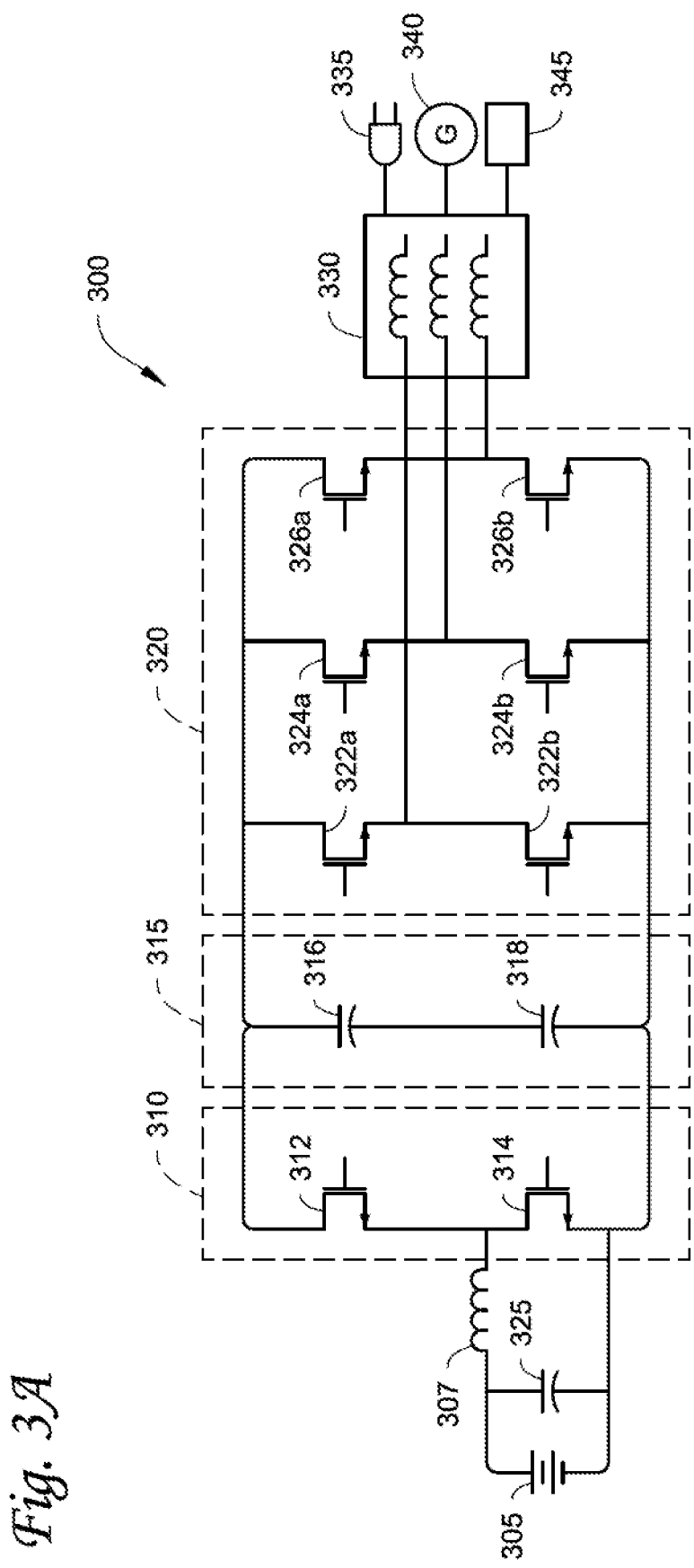
FIGS. 3A and 3B illustrate different embodiments of an optimized power converter for charging and discharging a rechargeable energy storage.

FIG. 3A illustrates a schematic diagram of an optimized power converter 300 for charging and discharging a rechargeable energy storage (e.g., battery pack) 305 (e.g., the rechargeable energy storage 230 shown in FIG. 2), according to a first embodiment. The optimized power converter 300 includes an accumulation module 307, an optimized DC/DC converter 310 (e.g., the optimized DC/DC converter 240 shown in FIG. 2), a DC link 315 and an inverter/active rectifier (also referred to as an active frontend "AFE") 320. In some embodiments, the optimized power converter 300 can also include an optional voltage stabilization capacitor 325, and an inductor stage 330. The optimized power converter 300 can be controlled using a controller (e.g., the controller 260 shown in FIG. 2). The optimized power converter 300 can be provided in a single circuit.

At one end, the rechargeable energy storage 305 is connected to the accumulation module 307. The optimized DC/DC converter 310 is connected between the accumulation module 307 and the DC link 315. The DC link 315 is connected between the optimized DC/DC converter 310 and the inverter/active rectifier 320. The inverter/active rectifier 320 can then be connected to, for example, a power source and/or one or more AC loads. In the embodiment shown in FIG. 3A, the inverter/active rectifier 320 can be connected to an external power source 335 (e.g., the external power network 208 shown in FIG. 2, a commercial charge station, etc.) or a standby machine 340 (e.g., the alternator 205, the generator 210 shown in FIG. 2). The inverter/active rectifier 320 can also be connected to one or more AC loads 345 such as, for example, a compressor (e.g., the compressor 255 shown in FIG. 2), a heater (e.g., the heater 275 shown in FIG. 2), one or more blowers (e.g., the one or more evaporator blowers 265 shown in FIG. 2), one or more fans (e.g., the condenser fans 270, etc.), the controller, etc.

The optimized power converter 300 is configured to operate in a charging mode and a discharge mode. When operating in the charging mode, the optimized power converter 300 is configured to buck a voltage from a power source (e.g., the external power source 335 and/or the standby machine 340) so that the rechargeable energy storage 305 can be charged. When operating in the discharge mode, the optimized power converter 300 is configured to boost a voltage from the rechargeable energy storage 305 so as to power the one or more AC loads 345.

The rechargeable energy storage 305 can be, for example, one or more 400 V DC batteries that form a battery pack. It will be appreciated that the voltage of the rechargeable energy storage 305 can vary based on its state of charge. For example, when the rechargeable energy storage 305 includes one or more 400 V DC batteries, the voltage can range between 250 V DC and 420 V DC.

The accumulation module 307 can be, for example, an inductor or a transformer. The accumulation module 307 can be used as a short term energy storage device to assist with DC/DC conversion.

The optimized DC/DC converter 310 has a simplified configuration that controls power flow to and from the rechargeable energy storage 305. In the charging mode, the optimized DC/DC converter 310 is configured to buck a DC voltage from the DC link 315 to from a DC link voltage level to a rechargeable energy storage voltage level that can be used to charge the rechargeable energy storage 305. In the discharge mode, the optimized DC/DC converter 310 is configured to boost a DC voltage provided by the rechargeable energy storage 305 from the rechargeable energy storage voltage level to the DC link voltage level and provide the boosted voltage to the DC link 315. When the rechargeable energy storage 305 is a 400 V DC power source having a rechargeable energy storage voltage level between about 250 V DC to 420 V DC, the DC link voltage level can be about 750 V DC to 800 V DC.

The optimized DC/DC converter 310 includes two switches 312, 314 that can be switched on and off in order to control power flow to and from the rechargeable energy storage 305. During the discharge mode, the switches 312, 314 can be controlled to maintain a constant output voltage to the DC link 315. During the charging mode, the switches 312, 314 can be controlled depending on whether the optimized power converter 300 is operating in a constant current mode or a constant voltage mode. In some embodiments, the switches 312, 314 can be controlled based on a varying duty cycle that can be dependent on, for example, a voltage of the rechargeable energy storage 305, a current setpoint through the optimized DC/DC converter 310, a state of charge of the rechargeable energy storage 305, a voltage of the DC link 315, etc. It will be appreciated that the switches 312, 314 can be a Metal-Oxide-Semiconductor Field-Effect Transistor (MOSFET), an Insulated Gate Bipolar Transistor (IGBT), or a Bipolar Junction Transistor (BJT), a thyristor, a Gate Turn-Off thyristor (GTO), an Integrated Gate-Commutated Thyristor (IGCT), or the like. As shown in FIG. 3A, a positive terminal of the rechargeable energy storage 305 is connected to a node of the optimized DC/DC power converter 310 between the two switches 312, 314.

When the optimized power converter 300 is configured to operate in the charging mode, the optimized DC/DC converter 310 can operate in a constant current mode and a constant voltage mode. In some embodiments, the controller can control operation of the optimized DC/DC converter 310 in the constant current mode when a state of charge of the rechargeable energy storage 305 is below a charge threshold and in the constant voltage mode when the state of charge of the rechargeable energy storage 305 is above the charge threshold. The charge threshold can be determined based on, for example, the chemistry type of the rechargeable energy storage 305, a state of health of the rechargeable energy storage 305, a temperature of the rechargeable energy storage 305, etc. In some embodiments, the charge threshold can be about 80%. When operating in the constant current mode, the optimized DC/DC converter 310 can more rapidly charge the rechargeable energy storage 305 than when operating in the constant voltage mode. In some embodiments, in the constant current mode the switches 312, 314 can be controlled using a closed loop pulse width modulation control based on monitoring an output current of the optimized DC/DC converter 310 and based on a slope generated by a difference between an input voltage to the optimized DC/DC converter 310 and an output voltage from the optimized DC/DC converter 310. When operating in the constant voltage mode, the optimized DC/DC converter 310 can more precisely charge the rechargeable energy storage 305 than when operating in the constant current mode. In some embodiments, in the constant voltage mode the switches 312, 314 can be controlled using a closed loop pulse width modulation control based on an input voltage to the optimized DC/DC converter 310 and an output filter of the optimized DC/DC converter 310. Accordingly, the rechargeable energy storage 305 can be charged to a higher state of charge without overcharging and causing damage to the rechargeable energy storage 305

As opposed to a full bi-directional DC/DC converter that can buck and boost a voltage in both directions, the optimized DC/DC converter 310 is simplified by having only the two switches 312, 314 in order to only allow the optimized DC/DC converter 310 to boost voltage from the rechargeable energy storage 305 and buck voltage to the rechargeable energy storage 305. Thus, the optimized DC/DC converter can be manufactured with less components (e.g., two switches 312, 314 as opposed to four switches) and for a lower price than a full bi-directional DC/DC converter.

The DC link 315 is configured to stabilize and smoothen power transferred between the optimized DC/DC converter 310 and the inverter/active rectifier 320. The DC link 315 can also prevent transients from passing between the optimized DC/DC converter 310 and the inverter/active rectifier 320. The DC link 315 shown in FIG. 3A includes two DC link capacitors 316, 318 that are connected in parallel with both the optimized DC/DC converter 310 and the inverter/active rectifier 320. It will be appreciated that in some embodiments, the DC link 315 can include only a single capacitor to replace the two DC link capacitors 316, 318.

When the optimized power converter 300 is operating in the charging mode, the inverter/active rectifier 320 is configured to operate as an active rectifier and convert three phase AC power from the power source (e.g., the external power source 335 and/or the standby machine 340) into DC power that can be transferred to the DC link 315. When the optimized power converter 300 is operating in the discharge mode, the inverter/active rectifier 320 is configured to operate as an inductor and convert DC power from the DC link 315 into three phase AC power that can be transferred to the one or more AC loads 345.

The inverter/active rectifier 320 includes three pairs of switches 322a and b, 324a and b, and 326a and b. Each pair of switches 322, 324, 326 are connected to separate phase of AC power. For example, when the optimized power converter 300 is operating in the charging mode, each pair of switches 322, 324, 326 are connected to a separate phase of the power source (e.g., the external power source 335 and/or the standby machine 340). When the optimized power converter 300 is operating in the discharge mode, each pair of switches 322, 324, 326 provides three phase AC power to one or more AC loads 345. It will be appreciated that the switches 322, 324, 326 can be a MOSFET, IGBT, a BJT, a thyristor, a GTO, an IGCT, or the like. When the rechargeable energy storage 305 is a 400 V DC power source having a rechargeable energy storage voltage level between about 250 V DC to 420 V DC, inverter/active rectifier 320 can convert DC power having a voltage of about 750-800 V DC (i.e., the DC link voltage level) to about 460 V AC power to the one or more AC loads 345. Also, the inverter/active rectifier 320 can convert three phase AC power having a voltage of about 460 V AC to a DC power having a voltage level of about 750-800 V DC (i.e., the DC link voltage level) that can be provided to the optimized DC/DC converter 310 before being bucked to about a 400 V DC voltage level to recharge the rechargeable energy storage 305.

In some embodiments, the inductor stage 330 can be positioned between the inverter/active rectifier 320 and one or more of the external power source 335, the standby machine 340, and the one or more AC loads 345. The inductor stage 330 can be a boost inductance to boost a voltage level of the converted three phase AC power from the inverter/active rectifier 320. When the optimized DC/DC converter 310 is operating in the charging mode, the inductor stage 330 can provide energy storage and can decouple an external power source from the optimized DC/DC converter 310.

In some embodiments, the optional voltage stabilization capacitor 325 can be positioned between the rechargeable energy storage 305 and the accumulation module 307. The optional voltage stabilization capacitor 325 is configured to operate as a filter that can stabilize a voltage level of power being transferred from the optimized DC/DC converter 310 to the rechargeable energy storage 305 during a charging mode and can stabilize a voltage level of power being transferred from the rechargeable energy storage 305 to the optimized DC/DC converter 310 during a discharge mode.

In some embodiments, the optimized power converter 300 can be used in ~30 kilowatt applications.

Figure 3B:
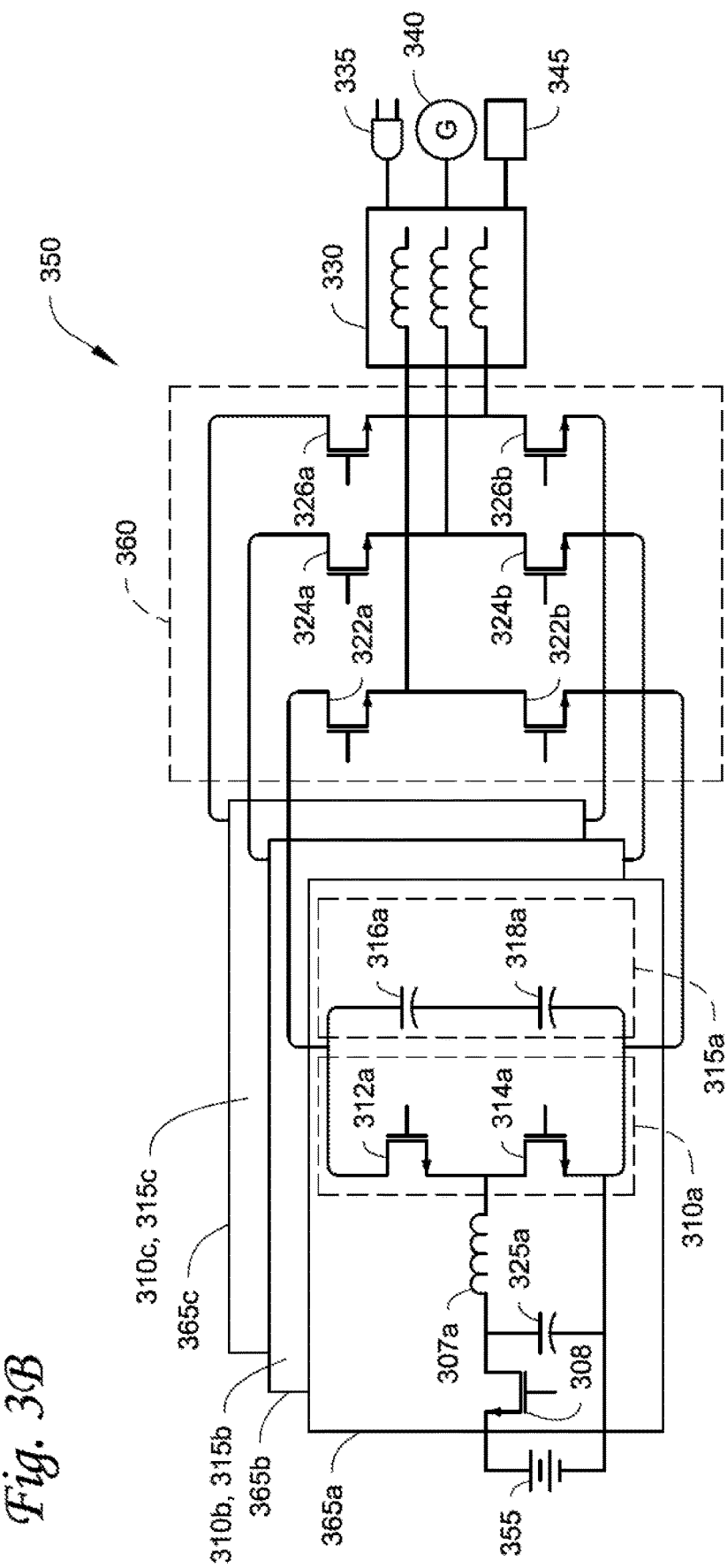

FIG. 3B illustrates a schematic diagram of an optimized power converter 350 for charging and discharging a rechargeable energy storage (e.g., battery pack) 355, according to a second embodiment. The optimized power converter 350 can be controlled using a controller (e.g., the controller 260 shown in FIG. 2). The optimized power converter 350 can be provided in a single circuit. The optimized power converter 350 is similar to the optimized power converter 300 shown in FIG. 3A, but can be used for larger power applications by using multi-phase DC interleaving between a large application rechargeable energy storage 355 and the inverter/active rectifier 320. The differences between the optimized power converter 300 and the optimized power converter 350 are discussed in detail below.

As opposed to a single accumulation module 307, a single optimized DC/DC converter 310, and a single DC link 315 as provided in the optimized power converter 300 shown in FIG. 3A, the optimized power converter 350 includes three combinations of accumulation modules 307a,b,c, optimized DC/DC converter 310a,b,c, and DC links 315a,b,c connected in parallel to the rechargeable energy storage 355.

The DC links 315a,b,c are connected to an inverter/active rectifier 360 differently than how the DC link 315 is connected to the inverter/active rectifier 320 of the optimized power converter 300. In particular, a first combination 365a of accumulation module 307a, optimized DC/DC converter 310a, and DC link 315a (including a pair of DC link capacitors 316a, 318a) are all connected as a single DC phase line that is connected to the pair of switches 322a,b of the inverter/active rectifier 360. Similarly, a second combination 365b of accumulation module 307b, optimized DC/DC converter 310b, and DC link 315b (including a pair of DC link capacitors 316b, 318b) are all connected as a single DC phase line that is connected to the pair of switches 324a,b of the inverter/active rectifier 360. Also, a third combination 365c of accumulation module 307c, optimized DC/DC converter 310c, and DC link 315c (including a pair of DC link capacitors 316c, 318c) are all connected as a single DC phase line that is connected to the pair of switches 326a,b of the inverter/active rectifier 360. The optimized power converter 350 can also optionally include three optional voltage stabilization capacitors 325 for each DC phase line. While FIG. 3B does not explicitly show the circuit configuration of the second combination 365b and the third combination 365c, it will be appreciated that it is the same as shown with respect to the first combination 365a.

Accordingly, when the optimized power converter 350 is operating in the charging mode, each phase of the outputted DC current from the inverter/active rectifier 360 is separated and connected to a separate combination 365 via a separate DC phase line. Thus, when the rechargeable energy storage 355 is a 400 V DC power source having a rechargeable energy storage voltage level between about 250 V DC to 420 V DC, the DC link voltage level can be about 750 V DC to 800 V DC. Also, the inverter/active rectifier 360 can convert DC power having a voltage of about 750-800 V DC (i.e., the DC link voltage level) to about 460 V AC power to the one or more AC loads 345.

When the optimized power converter 350 is operating in the discharge mode, the current outputted from the rechargeable energy storage 355 is separated into each of the combinations 365a,b,c and the DC current output from each of the DC links 315a,b,c are sent to a different pair of switches 322, 324, 326 of the inverter/active rectifier 360. Thus, the inverter/active rectifier 360 can convert three phase AC power having a voltage of about 460 V AC to a DC power having a voltage level of about 750-800 V DC (i.e., the DC link voltage level) that can be provided to the optimized DC/DC converter 310 before being bucked to about a 400 V DC voltage level to recharge the rechargeable energy storage 305.

While the optimized power converter 350 uses multi-phase DC interleaving that includes three sets of accumulation modules 307a,b,c, optimized DC/DC converter 310a,b,c, and DC links 315a,b,c connected in parallel to the rechargeable energy storage 355, it will be appreciated that in other embodiments an optimized power converter can include two phase DC interleaving, or four or more phase DC interleaving.

In some embodiments, the optimized power converter 350 can include an optional high voltage relay 308 that allows a controller to isolate/disconnect the rechargeable energy storage 355 from the optimized power converter 350 when not in operation.

In some embodiments, the optimized power converter 350 can be used in 120 kilowatt-180 kilowatt applications.

Returning to FIG. 3A, it will be appreciated that the optimized power converter 300 can be limited based on the amount of current that can be sent through the various switches and inductors (e.g., switches 312, 314, 322, 324, 326 and inductor 307). Accordingly, the optimized power converter 300 can be used in smaller power applications such as, for example, a transport climate control system for a straight truck application (e.g., the transport climate control system 132 shown in FIG. 1B), battery holdover applications, etc.

In contrast, the use of multi-phase DC interleaving in the optimized power converter 350 shown in FIG. 3B allows current to be split through each of the combinations 365a, b,c, thereby increasing the current capacity through the optimized power converter 350. Thus, the optimized power converter 350 has added capability and can be used in larger power applications such as, for example, a transport climate control system for a trailer application (e.g., the transport climate control systems 145 and 162 shown in FIGS. 1C and 1D). The use of multi-phase DC interleaving can also reduce electromagnetic interference within the optimized power converter 350. Also, in some embodiments, the use of multi-phase DC interleaving in the optimized power converter 350 can be used to alternatively operate in the charging mode and the discharge mode by, for example, controlling one or more of the combinations 365 to operate in the charging mode and controlling the other combinations 365 to operate in the discharge mode.

Figure 4:
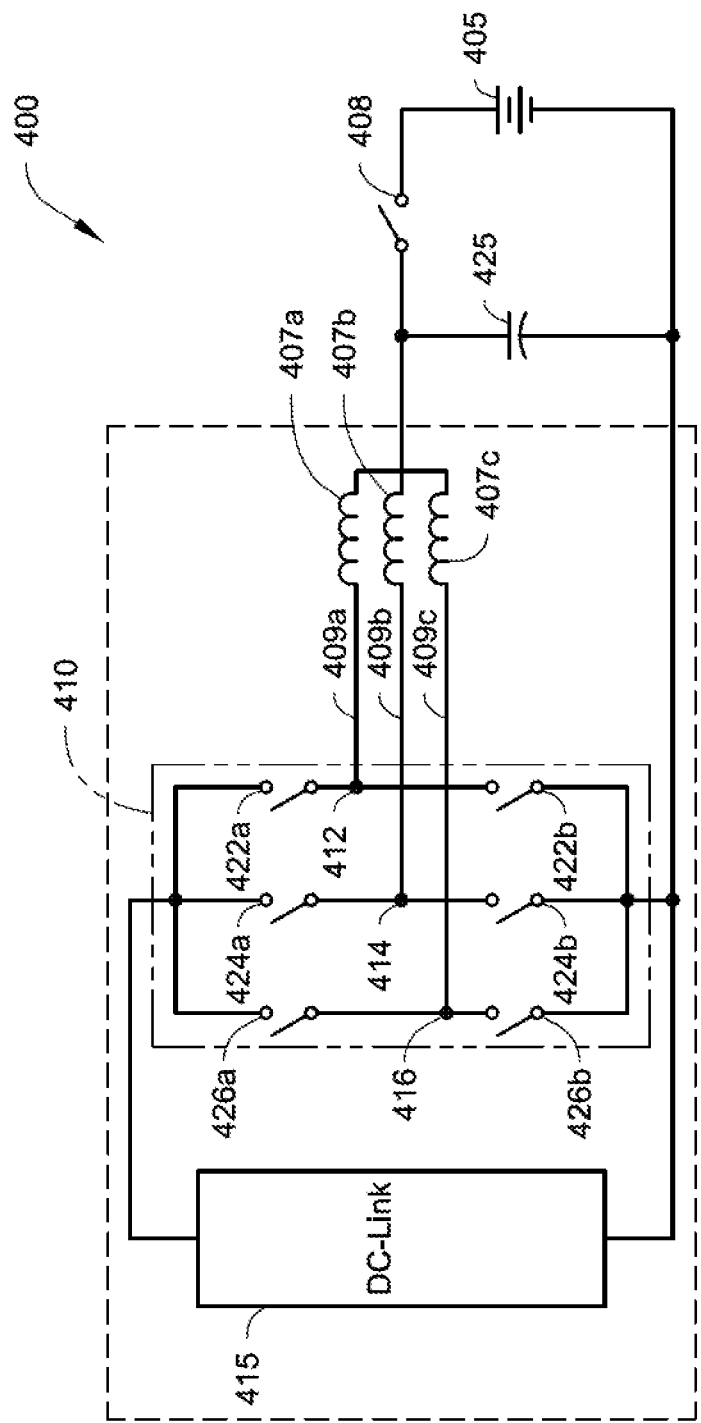
FIG. 4 illustrates a schematic diagram of portion of an optimized power converter using multi-phase DC interleaving that is operating as a modified inverter stage, according to one embodiment.

One embodiment of operating in a charging mode and alternatively in a discharge mode through the use of multi-phase DC interleaving is described below with respect to FIG. 4. In particular, FIG. 4 illustrates a schematic diagram of portion of an optimized power converter using multi-phase DC interleaving (e.g., the optimized power converter 350 shown in FIG. 3B) that is operating as a modified inverter stage 400, according to one embodiment. The modified inverter stage 400 is connected to a rechargeable energy storage 405 and an optional voltage stabilization capacitor 425 that are coupled in parallel. An optional high voltage relay 408 can also be provided between the optional voltage stabilization capacitor 425 and the rechargeable energy storage 405.

The modified inverter stage 400 includes a DC link 415, an optimized DC/DC converter 410, and a set of accumulation modules 407a,b,c. The DC link 415 is connected to the optimized DC/DC converter 410 and the optimized DC/DC converter 410 is connected to the set of accumulation modules 407a,b,c. The DC link 415 can be similar to the DC link 315 shown in FIG. 3A. In some embodiments, the DC link 415 can include two DC link capacitors (not shown) that are connected in parallel with both the optimized DC/DC converter 410 and an inverter/active rectifier (not shown).

The optimized DC/DC converter 410 includes three pairs of switches 422a,b, 424a,b, and 426a,b. A node 412 between the first pair of switches 422a,b is connected to the first accumulation module 407a via a first DC phase line 409a. Similarly, a node 414 between the second pair of switches 424a,b is connected to the second accumulation module 407b via a second DC phase line 409b. Also, a node 416 between the third pair of switches 426a,b is connected to the third accumulation module 407c via a third DC phase line 409c.

It will be appreciated that the switches 422, 424, 426 can be a MOSFET, IGBT, a BJT, a thyristor, a GTO, an IGCT, or the like.

The accumulation modules 407 can be, for example, an inductor or a transformer. The output of the accumulation modules 407 merge together and are connected to the rechargeable energy storage 405. The output of the accumulation modules 407 can also be connected to the optional voltage stabilization capacitor 425 and the optional high voltage relay 408.

A positive terminal of the rechargeable energy storage 405 is connected to a node of the optimized DC/DC power converter 410 between the two switches 412, 414. Depending on whether the optimized power converter (of which the modified inverter stage 400 is part of) is operating in a charging mode or a discharge mode can determine whether the rechargeable energy storage 405 is receiving power from a power source (e.g., the external power source 335 and/or the standby machine 340).

A controller (not shown) can control the three pairs of switches 422a,b, 424a,b, and 426a,b to switch and/or alternatively operate between the charging mode and the discharge mode. In particular, the controller can determine when to initiate the charging mode and initiate the discharge mode based on, for example, a status of the DC link 415, a status of a power source (e.g., the external power source 335 and/or the standby machine 340), and/or power needs of one or more components of a transport climate control system powered by the optimized power converter. In some embodiments, the controller can control the three pairs of switches 422a,b, 424a,b, and 426a,b using a PWM scheme.

The optional high voltage relay 408 allows a controller to isolate/disconnect the rechargeable energy storage 455 from the optimized power converter (of which the modified inverter stage 400 is part of) when not in operation. The optional voltage stabilization capacitor 425 is configured to operate as a filter that can stabilize a voltage level of power being transferred from the optimized DC/DC converter 410 to the rechargeable energy storage 455 during a charging mode and can stabilize a voltage level of power being transferred from the rechargeable energy storage 455 to the optimized DC/DC converter 410 during a discharge mode.

Aspects:

It will be appreciated that any of aspects 1-8, aspects 9-16, aspects 17-24, and aspects 25-32 can be combined.

Aspect 1. An optimized power converter for use in a transport electrical system that provides power to a transport climate control system, the optimized power converter comprising:

an optimized DC/DC converter connected between a rechargeable energy storage of the transport electrical system that provides DC power and an inverter/active rectifier, wherein the optimized DC/DC converter is configured to only boost a voltage level when current is directed from the rechargeable energy storage to the inverter/active rectifier and is configured to only buck a voltage level when current is directed from the inverter/active rectifier to the rechargeable energy storage; and the inverter/active rectifier connected to the optimized DC/DC converter, wherein the optimized power converter is configured to operate in a charging mode and a discharge mode, wherein when the optimized power converter is operating in the charging mode, the inverter/active rectifier is configured to convert three phase AC power into DC power, and the optimized power converter is configured to buck the DC power to a voltage level that is acceptable for charging the rechargeable energy storage, and wherein when the optimized power converter is operating in the discharge mode, the optimized DC/DC converter is configured to boost voltage from the rechargeable energy storage, and the inverter/active rectifier is configured to convert boosted DC power into three phase AC power for powering one or more AC loads of the transport climate control system.

Aspect 2. The optimized power converter of aspect 1, further comprising a DC link connected to both the optimized DC/DC converter and the inverter/active rectifier, wherein the DC link stabilizes and smoothens power transferred between the optimized DC/DC converter and the inverter/active rectifier.

Aspect 3. The optimized power converter of any one of aspects 1 and 2, wherein the optimized DC/DC converter includes a first switch, a second switch connected to the first switch, and a node positioned between the first and second switches, and
wherein the a positive terminal of the rechargeable energy storage is connected to the node.

Aspect 4. The optimized power converter of aspect 3, wherein the first switch and the second switch are independently controlled to boost a voltage of current directed from the rechargeable energy storage to the inverter/active rectifier and to buck a voltage of current directed from the inverter/active rectifier to the rechargeable energy storage.

Aspect 5. The optimized power converter of any one of aspects 1-4, further comprising an accumulation module, with a first end of the accumulation module connected to a positive terminal of the rechargeable energy storage and a second end of the accumulation module connected to the optimized DC/DC converter.

Aspect 6. The optimized power converter of any one of aspects 1-5, further comprising a plurality of accumulation modules, wherein a first end of each of the plurality of accumulation modules is connected to a positive terminal of the rechargeable energy storage,
wherein the optimized DC/DC converter includes:
a first pair of switches, a second pair of switches, and a third pair of switches that are connected in parallel with each other;
a first node positioned in between the first pair of switches, a second node positioned in between the second pair of switches, and a third node positioned between the third pair of switches;
wherein a first accumulation module of the plurality of accumulation modules is connected to the first node via a first DC phase line, a second accumulation module of the plurality of accumulation modules is connected to the second node via a second DC phase line, and a third accumulation module of the plurality of accumulation modules is connected to the third node via a third DC phase line.

Aspect 7. The optimized power converter of aspect 6, wherein the optimized DC/DC converter is configured to send current from the inverter/active rectifier to the rechargeable energy storage via at least one of the first DC phase line, the second DC phase line and the third DC phase line when operating in a charging mode, and send current from the rechargeable energy storage to the inverter/active rectifier via at least another one of the first DC phase line, the second DC phase line and the third DC phase line when operating in a discharge mode.

Aspect 8. The optimized power converter of any one of aspects 6 and 7, wherein each of the first pair of switches are independently controlled to boost a voltage of current directed, via the first DC phase line, from the rechargeable energy storage to the inverter/active rectifier and to buck a voltage of current directed from the inverter/active rectifier to the rechargeable energy storage,
wherein each of the second pair of switches are independently controlled to boost a voltage of current directed, via the second DC phase line, from the rechargeable energy storage to the inverter/active rectifier and to buck a voltage of current directed from the inverter/active rectifier to the rechargeable energy storage,
wherein each of the third pair of switches are independently controlled to boost a voltage of current directed, via the third DC phase line, from the rechargeable energy storage to the inverter/active rectifier and to buck a voltage of current directed from the inverter/active rectifier to the rechargeable energy storage.

Aspect 9. A transport electrical system for powering a transport climate control system, the transport electrical system comprising:
a transport climate control load network that includes a plurality of transport climate control loads that use power to operate the transport climate control system; and
an optimized power converter that provides power to one or more transport climate control loads of the transport climate control load network, the optimized power converter including:
an optimized DC/DC converter connected between a rechargeable energy storage of the transport electrical system that provides DC power and an inverter/active rectifier, wherein the optimized DC/DC converter is configured to only boost a voltage level when current is directed from the rechargeable energy storage to the inverter/active rectifier and is configured to only buck a voltage level when current is directed from the inverter/active rectifier to the rechargeable energy storage, and
the inverter/active rectifier connected to the optimized DC/DC converter,
wherein the optimized power converter is configured to operate in a charging mode and a discharge mode,
wherein when the optimized power converter is operating in the charging mode, the inverter/active rectifier is configured to convert three phase AC power into DC power, and the optimized power converter is configured to buck the DC power to a voltage level that is acceptable for charging the rechargeable energy storage, and
wherein when the optimized power converter is operating in the discharge mode, the optimized DC/DC converter is configured to boost voltage from the rechargeable energy storage, and the inverter/active rectifier is configured to convert boosted DC power into three phase AC power for powering the one or more transport climate control loads.

Aspect 10. The transport electrical system of aspect 9, wherein the optimized power converter includes a DC link connected to the optimized DC/DC converter, wherein the DC link stabilizes and smoothens power transferred between the optimized DC/DC converter and the inverter/active rectifier.

Aspect 11. The transport electrical system of any one of aspects 9 and 10, wherein the optimized DC/DC converter includes a first switch, a second switch connected to the first switch, and a node positioned between the first and second switches, and
wherein the a positive terminal of the rechargeable energy storage is connected to the node.

Aspect 12. The transport electrical system of aspect 11, wherein the first switch and the second switch are independently controlled to boost a voltage of current directed from the rechargeable energy storage to the inverter/active rectifier and to buck a voltage of current directed from the inverter/active rectifier to the rechargeable energy storage.

Aspect 13. The transport electrical system of any one of aspects 9-12, wherein the optimized power converter includes an accumulation module, with a first end of the accumulation module connected to a positive terminal of the rechargeable energy storage and a second end of the accumulation module connected to the optimized DC/DC converter.

Aspect 14. The transport electrical system of any one of aspects 9-13, wherein the optimized power converter includes a plurality of accumulation modules, wherein a first end of each of the plurality of accumulation modules is connected to a positive terminal of the rechargeable energy storage,
wherein the optimized DC/DC converter includes:
a first pair of switches, a second pair of switches, and a third pair of switches that are connected in parallel with each other;
a first node positioned in between the first pair of switches, a second node positioned in between the second pair of switches, and a third node positioned between the third pair of switches;
wherein a first accumulation module of the plurality of accumulation modules is connected to the first node via a first DC phase line, a second accumulation module of the plurality of accumulation modules is connected to the second node via a second DC phase line, and a third accumulation module of the plurality of accumulation modules is connected to the third node via a third DC phase line.

Aspect 15. The transport electrical system of aspect 14, wherein the optimized DC/DC converter is configured to send current from the inverter/active rectifier to the rechargeable energy storage via at least one of the first DC phase line, the second DC phase line and the third DC phase line when operating in a charging mode, and send current from the rechargeable energy storage to the inverter/active rectifier via at least another one of the first DC phase line, the second DC phase line and the third DC phase line when operating in a discharge mode.

Aspect 16. The transport electrical system of any one of aspects 14 and 15, wherein each of the first pair of switches are independently controlled to boost a voltage of current directed, via the first DC phase line, from the rechargeable energy storage to the inverter/active rectifier and to buck a voltage of current directed from the inverter/active rectifier to the rechargeable energy storage,
wherein each of the second pair of switches are independently controlled to boost a voltage of current directed, via the second DC phase line, from the rechargeable energy storage to the inverter/active rectifier and to buck a voltage of current directed from the inverter/active rectifier to the rechargeable energy storage,
wherein each of the third pair of switches are independently controlled to boost a voltage of current directed, via the third DC phase line, from the rechargeable energy storage to the inverter/active rectifier and to buck a voltage of current directed from the inverter/active rectifier to the rechargeable energy storage.

Aspect 17. An optimized power converter for use in a transport electrical system that provides power to an electrically powered accessory, the optimized power converter comprising:
an optimized DC/DC converter connected between a rechargeable energy storage of the transport electrical system that provides DC power and an inverter/active rectifier, wherein the optimized DC/DC converter is configured to only boost a voltage level when current is directed from the rechargeable energy storage to the inverter/active rectifier and is configured to only buck a voltage level when current is directed from the inverter/active rectifier to the rechargeable energy storage; and
the inverter/active rectifier connected to the optimized DC/DC converter,
wherein the optimized power converter is configured to operate in a charging mode and a discharge mode,
wherein when the optimized power converter is operating in the charging mode, the inverter/active rectifier is configured to convert three phase AC power into DC power, and the optimized power converter is configured to buck the DC power to a voltage level that is acceptable for charging the rechargeable energy storage, and
wherein when the optimized power converter is operating in the discharge mode, the optimized DC/DC converter is configured to boost voltage from the rechargeable energy storage, and the inverter/active rectifier is configured to convert boosted DC power into three phase AC power for powering one or more AC loads of the electrically powered accessory.

Aspect 18. The optimized power converter of aspect 17, further comprising a DC link connected to both the optimized DC/DC converter and the inverter/active rectifier, wherein the DC link stabilizes and smoothens power transferred between the optimized DC/DC converter and the inverter/active rectifier.

Aspect 19. The optimized power converter of any one of aspects 17 and 18, wherein the optimized DC/DC converter includes a first switch, a second switch connected to the first switch, and a node positioned between the first and second switches, and
wherein the a positive terminal of the rechargeable energy storage is connected to the node.

Aspect 20. The optimized power converter of aspect 19, wherein the first switch and the second switch are independently controlled to boost a voltage of current directed from the rechargeable energy storage to the inverter/active rectifier and to buck a voltage of current directed from the inverter/active rectifier to the rechargeable energy storage.

Aspect 21. The optimized power converter of any one of aspects 17-20, further comprising an accumulation module, with a first end of the accumulation module connected to a positive terminal of the rechargeable energy storage and a second end of the accumulation module connected to the optimized DC/DC converter.

Aspect 22. The optimized power converter of any one of aspects 17-21, further comprising a plurality of accumulation modules, wherein a first end of each of the plurality of accumulation modules is connected to a positive terminal of the rechargeable energy storage,
wherein the optimized DC/DC converter includes:
a first pair of switches, a second pair of switches, and a third pair of switches that are connected in parallel with each other;
a first node positioned in between the first pair of switches, a second node positioned in between the second pair of switches, and a third node positioned between the third pair of switches;
wherein a first accumulation module of the plurality of accumulation modules is connected to the first node via a first DC phase line, a second accumulation module of the plurality of accumulation modules is connected to the second node via a second DC phase line, and a third accumulation module of the plurality of accumulation modules is connected to the third node via a third DC phase line.

Aspect 23. The optimized power converter of aspect 22, wherein the optimized DC/DC converter is configured to send current from the inverter/active rectifier to the rechargeable energy storage via at least one of the first DC phase line, the second DC phase line and the third DC phase line when operating in a charging mode, and send current from the rechargeable energy storage to the inverter/active rectifier via at least another one of the first DC phase line, the second DC phase line and the third DC phase line when operating in a discharge mode.

Aspect 24. The optimized power converter of any one of aspects 22 and 23, wherein each of the first pair of switches are independently controlled to boost a voltage of current directed, via the first DC phase line, from the rechargeable energy storage to the inverter/active rectifier and to buck a voltage of current directed from the inverter/active rectifier to the rechargeable energy storage, wherein each of the second pair of switches are independently controlled to boost a voltage of current directed, via the second DC phase line, from the rechargeable energy storage to the inverter/active rectifier and to buck a voltage of current directed from the inverter/active rectifier to the rechargeable energy storage, wherein each of the third pair of switches are independently controlled to boost a voltage of current directed, via the third DC phase line, from the rechargeable energy storage to the inverter/active rectifier and to buck a voltage of current directed from the inverter/active rectifier to the rechargeable energy storage.

Aspect 25. A transport electrical system for powering an electrically powered accessory, the transport electrical system comprising:

an electrically powered accessory load network that includes a plurality of electrically powered accessory loads that use power to operate the electrically powered accessory; and an optimized power converter that provides power to one or more electrically powered accessory loads of the electrically powered accessory load network, the optimized power converter including:

an optimized DC/DC converter connected between a rechargeable energy storage of the transport electrical system that provides DC power and an inverter/active rectifier, wherein the optimized DC/DC converter is configured to only boost a voltage level when current is directed from the rechargeable energy storage to the inverter/active rectifier and is configured to only buck a voltage level when current is directed from the inverter/active rectifier to the rechargeable energy storage, and the inverter/active rectifier connected to the optimized DC/DC converter, wherein the optimized power converter is configured to operate in a charging mode and a discharge mode, wherein when the optimized power converter is operating in the charging mode, the inverter/active rectifier is configured to convert three phase AC power into DC power, and the optimized power converter is configured to buck the DC power to a voltage level that is acceptable for charging the rechargeable energy storage, and wherein when the optimized power converter is operating in the discharge mode, the optimized DC/DC converter is configured to boost voltage from the rechargeable energy storage, and the inverter/active rectifier is configured to convert boosted DC power into three phase AC power for powering the one or more electrically powered accessory loads.

Aspect 26. The transport electrical system of aspect 25, wherein the optimized power converter includes a DC link connected to the optimized DC/DC converter, wherein the DC link stabilizes and smoothens power transferred between the optimized DC/DC converter and the inverter/active rectifier.

Aspect 27. The transport electrical system of any one of aspects 25 and 26, wherein the optimized DC/DC converter includes a first switch, a second switch connected to the first switch, and a node positioned between the first and second switches, and wherein the a positive terminal of the rechargeable energy storage is connected to the node.

Aspect 28. The transport electrical system of aspect 27, wherein the first switch and the second switch are independently controlled to boost a voltage of current directed from the rechargeable energy storage to the inverter/active rectifier and to buck a voltage of current directed from the inverter/active rectifier to the rechargeable energy storage.

Aspect 29. The transport electrical system of any one of aspects 25-28, wherein the optimized power converter includes an accumulation module, with a first end of the accumulation module connected to a positive terminal of the rechargeable energy storage and a second end of the accumulation module connected to the optimized DC/DC converter.

Aspect 30. The transport electrical system of any one of aspects 25-29, wherein the optimized power converter includes a plurality of accumulation modules, wherein a first end of each of the plurality of accumulation modules is connected to a positive terminal of the rechargeable energy storage, wherein the optimized DC/DC converter includes:
  a first pair of switches, a second pair of switches, and a third pair of switches that are connected in parallel with each other;
  a first node positioned in between the first pair of switches, a second node positioned in between the second pair of switches, and a third node positioned between the third pair of switches;

wherein a first accumulation module of the plurality of accumulation modules is connected to the first node via a first DC phase line, a second accumulation module of the plurality of accumulation modules is connected to the second node via a second DC phase line, and a third accumulation module of the plurality of accumulation modules is connected to the third node via a third DC phase line.

Aspect 31. The transport electrical system of aspect 30, wherein the optimized DC/DC converter is configured to send current from the inverter/active rectifier to the rechargeable energy storage via at least one of the first DC phase line, the second DC phase line and the third DC phase line when operating in a charging mode, and send current from the rechargeable energy storage to the inverter/active rectifier via at least another one of the first DC phase line, the second DC phase line and the third DC phase line when operating in a discharge mode.

Aspect 32. The transport electrical system of any one of aspects 30 and 31, wherein each of the first pair of switches are independently controlled to boost a voltage of current directed, via the first DC phase line, from the rechargeable energy storage to the inverter/active rectifier and to buck a voltage of current directed from the inverter/active rectifier to the rechargeable energy storage, wherein each of the second pair of switches are independently controlled to boost a voltage of current directed, via the second DC phase line, from the rechargeable energy storage to the inverter/active rectifier and to buck a voltage of current directed from the inverter/active rectifier to the rechargeable energy storage, wherein each of the third pair of switches are independently controlled to boost a voltage of current directed, via the third DC phase line, from the rechargeable energy storage to the inverter/active rectifier and to buck a voltage of current directed from the inverter/active rectifier to the rechargeable energy storage.

With regard to the foregoing description, it is to be understood that changes may be made in detail, without departing from the scope of the present invention. It is intended that the specification and depicted embodiments are to be considered exemplary only, with a true scope and spirit of the invention being indicated by the broad meaning of the claims.

What is claimed is:

1. An optimized power converter for use in a transport electrical system that provides power to a transport climate control system, the optimized power converter comprising:
    an optimized DC/DC converter connected between a rechargeable energy storage of the transport electrical system that provides DC power and an inverter/active rectifier, wherein the optimized DC/DC converter is configured to only boost a voltage level when current is directed from the rechargeable energy storage to the inverter/active rectifier and is configured to only buck a voltage level when current is directed from the inverter/active rectifier to the rechargeable energy storage;
    the inverter/active rectifier connected to the optimized DC/DC converter; and
    an inductor stage positioned between the inverter/active rectifier and both of a standby machine and one or more AC loads of the transport climate control system, wherein the one or more AC loads of the transport climate control system includes a compressor of a climate control circuit used to provide climate control within a climate controlled space,
    wherein the optimized power converter is configured to operate in a charging mode and a discharge mode,
    wherein when the optimized power converter is operating in the charging mode, the inverter/active rectifier is configured to convert three phase AC power into DC power, the optimized power converter is configured to buck the DC power to a voltage level that is acceptable for charging the rechargeable energy storage, and the inductor stage is configured to decouple an external power source from the optimized DC/DC converter, and
    wherein when the optimized power converter is operating in the discharge mode, the optimized DC/DC converter is configured to boost voltage from the rechargeable energy storage, the inverter/active rectifier is configured to convert boosted DC power into three phase AC power for powering the one or more AC loads of the transport climate control system including the compressor, and the inductor stage is configured to adjust a voltage level of the three phase AC power from the inverter/active rectifier to power the compressor.

2. The optimized power converter of claim 1, further comprising a DC link connected to the optimized DC/DC converter, wherein the DC link stabilizes and smoothens power transferred between the optimized DC/DC converter and the inverter/active rectifier.

3. The optimized power converter of claim 1, wherein the optimized DC/DC converter includes a first switch, a second switch connected to the first switch, and a node positioned between the first and second switches, and
    wherein a positive terminal of the rechargeable energy storage is connected to the node.

4. The optimized power converter of claim 3, wherein the first switch and the second switch are independently controlled to boost a voltage of current directed from the rechargeable energy storage to the inverter/active rectifier and to buck a voltage of current directed from the inverter/active rectifier to the rechargeable energy storage.

5. The optimized power converter of claim 1, further comprising an accumulation module, with a first end of the accumulation module connected to a positive terminal of the rechargeable energy storage and a second end of the accumulation module connected to the optimized DC/DC converter.

6. The optimized power converter of claim 1, further comprising a plurality of accumulation modules, wherein a first end of each of the plurality of accumulation modules is connected to a positive terminal of the rechargeable energy storage,
    wherein the optimized DC/DC converter includes:
        a first pair of switches, a second pair of switches, and a third pair of switches that are connected in parallel with each other;
        a first node positioned in between the first pair of switches, a second node positioned in between the second pair of switches, and a third node positioned between the third pair of switches;
    wherein a first accumulation module of the plurality of accumulation modules is connected to the first node via a first DC phase line, a second accumulation module of the plurality of accumulation modules is connected to the second node via a second DC phase line, and a third accumulation module of the plurality of accumulation modules is connected to the third node via a third DC phase line.

7. The optimized power converter of claim 6, wherein the optimized DC/DC converter is configured to send current from the inverter/active rectifier to the rechargeable energy storage via at least one of the first DC phase line, the second DC phase line and the third DC phase line when operating in a charging mode, and send current from the rechargeable energy storage to the inverter/active rectifier via at least another one of the first DC phase line, the second DC phase line and the third DC phase line when operating in a discharge mode.

8. The optimized power converter of claim 6, wherein each of the first pair of switches are independently controlled to boost a voltage of current directed, via the first DC phase line, from the rechargeable energy storage to the inverter/active rectifier and to buck a voltage of current directed from the inverter/active rectifier to the rechargeable energy storage,
    wherein each of the second pair of switches are independently controlled to boost a voltage of current directed, via the second DC phase line, from the rechargeable energy storage to the inverter/active rectifier and to buck a voltage of current directed from the inverter/active rectifier to the rechargeable energy storage,
    wherein each of the third pair of switches are independently controlled to boost a voltage of current directed, via the third DC phase line, from the rechargeable energy storage to the inverter/active rectifier and to buck a voltage of current directed from the inverter/active rectifier to the rechargeable energy storage.

9. The optimized power converter of claim 1, wherein the optimized DC/DC converter and the inverter/active rectifier are provided in a single circuit, and wherein all charging and discharging of the rechargeable energy storage is integrated into the single circuit.

10. The optimized power converter of claim 1, further comprising:

a second optimized DC/DC converter connected between the rechargeable energy storage of the transport electrical system that provides DC power and the inverter/active rectifier, wherein the second optimized DC/DC converter is configured to only boost a voltage level when current is directed from the rechargeable energy storage to the inverter/active rectifier and is configured to only buck a voltage level when current is directed from the inverter/active rectifier to the rechargeable energy storage;

wherein the optimized power converter is configured to provide multi-phase DC interleaving such that:

when the optimized power converter is operating in the charging mode, the inverter/active rectifier is configured to convert three phase AC power into DC power with multiple phases such that a first DC phase line of the DC power is directed to the optimized DC/DC converter and a second DC phase line of the DC power is directed to the second optimized DC/DC converter, and when the optimized power converter is operating in the discharge mode, current outputted from the rechargeable energy storage is separated and directed to each of the optimized DC/DC converter and the second optimized DC/DC converter.

11. A transport electrical system for powering a transport climate control system, the transport electrical system comprising:

a transport climate control load network that includes a plurality of transport climate control loads that use power to operate the transport climate control system, wherein the plurality of transport climate control loads includes a compressor of a climate control circuit used to provide climate control within a climate controlled space; and an optimized power converter that provides power to one or more transport climate control loads of the transport climate control load network including the compressor, the optimized power converter including:

an optimized DC/DC converter connected between a rechargeable energy storage of the transport electrical system that provides DC power and an inverter/active rectifier, wherein the optimized DC/DC converter is configured to only boost a voltage level when current is directed from the rechargeable energy storage to the inverter/active rectifier and is configured to only buck a voltage level when current is directed from the inverter/active rectifier to the rechargeable energy storage, the inverter/active rectifier connected to the optimized DC/DC converter, and an inductor stage positioned between the inverter/active rectifier and both of a standby machine and the plurality of transport climate control loads, wherein the optimized power converter is configured to operate in a charging mode and a discharge mode, wherein when the optimized power converter is operating in the charging mode, the inverter/active rectifier is configured to convert three phase AC power into DC power, the optimized power converter is configured to buck the DC power to a voltage level that is acceptable for charging the rechargeable energy storage, and the inductor stage is configured to decouple an external power source from the optimized DC/DC converter, and wherein when the optimized power converter is operating in the discharge mode, the optimized DC/DC converter is configured to boost voltage from the rechargeable energy storage, the inverter/active rectifier is configured to convert boosted DC power into three phase AC power for powering the plurality of transport climate control loads including the compressor, and the inductor stage is configured to adjust a voltage level of the three phase AC power from the inverter/active rectifier to power the compressor.

12. The transport electrical system of claim 11, wherein the optimized power converter includes a DC link connected to the optimized DC/DC converter, wherein the DC link stabilizes and smoothens power transferred between the optimized DC/DC converter and the inverter/active rectifier.

13. The transport electrical system of claim 11, wherein the optimized DC/DC converter includes a first switch, a second switch connected to the first switch, and a node positioned between the first and second switches, and wherein a positive terminal of the rechargeable energy storage is connected to the node.

14. The transport electrical system of claim 13, wherein the first switch and the second switch are independently controlled to boost a voltage of current directed from the rechargeable energy storage to the inverter/active rectifier and to buck a voltage of current directed from the inverter/active rectifier to the rechargeable energy storage.

15. The transport electrical system of claim 11, wherein the optimized power converter includes an accumulation module, with a first end of the accumulation module connected to a positive terminal of the rechargeable energy storage and a second end of the accumulation module connected to the optimized DC/DC converter.

16. The transport electrical system of claim 11, wherein the optimized power converter includes a plurality of accumulation modules, wherein a first end of each of the plurality of accumulation modules is connected to a positive terminal of the rechargeable energy storage, wherein the optimized DC/DC converter includes:
  a first pair of switches, a second pair of switches, and a third pair of switches that are connected in parallel with each other;
  a first node positioned in between the first pair of switches, a second node positioned in between the second pair of switches, and a third node positioned between the third pair of switches;

wherein a first accumulation module of the plurality of accumulation modules is connected to the first node via a first DC phase line, a second accumulation module of the plurality of accumulation modules is connected to the second node via a second DC phase line, and a third accumulation module of the plurality of accumulation modules is connected to the third node via a third DC phase line.

17. The transport electrical system of claim 16, wherein the optimized DC/DC converter is configured to send current from the inverter/active rectifier to the rechargeable energy storage via at least one of the first DC phase line, the second DC phase line and the third DC phase line when operating in a charging mode, and send current from the rechargeable energy storage to the inverter/active rectifier via at least another one of the first DC phase line, the second DC phase line and the third DC phase line when operating in a discharge mode.

18. The transport electrical system of claim 16, wherein each of the first pair of switches are independently controlled to boost a voltage of current directed, via the first DC phase line, from the rechargeable energy storage to the inverter/active rectifier and to buck a voltage of current directed from the inverter/active rectifier to the rechargeable energy storage,
- wherein each of the second pair of switches are independently controlled to boost a voltage of current directed, via the second DC phase line, from the rechargeable energy storage to the inverter/active rectifier and to buck a voltage of current directed from the inverter/active rectifier to the rechargeable energy storage,
- wherein each of the third pair of switches are independently controlled to boost a voltage of current directed, via the third DC phase line, from the rechargeable energy storage to the inverter/active rectifier and to buck a voltage of current directed from the inverter/active rectifier to the rechargeable energy storage.

19. The transport electrical system of claim 11, wherein the optimized DC/DC converter and the inverter/active rectifier are provided in a single circuit, and
- wherein all charging and discharging of the rechargeable energy storage is integrated into the single circuit.

20. The transport electrical system of claim 11, wherein the optimized power converter further includes:
- a second optimized DC/DC converter connected between the rechargeable energy storage of the transport electrical system that provides DC power and the inverter/active rectifier, wherein the second optimized DC/DC converter is configured to only boost a voltage level when current is directed from the rechargeable energy storage to the inverter/active rectifier and is configured to only buck a voltage level when current is directed from the inverter/active rectifier to the rechargeable energy storage;
- wherein the optimized power converter is configured to provide multi-phase DC interleaving such that:
  - when the optimized power converter is operating in the charging mode, the inverter/active rectifier is configured to convert three phase AC power into DC power with multiple phases such that a first DC phase line of the DC power is directed to the optimized DC/DC converter and a second DC phase line of the DC power is directed to the second optimized DC/DC converter, and
  - when the optimized power converter is operating in the discharge mode, current outputted from the rechargeable energy storage is separated and directed to each of the optimized DC/DC converter and the second optimized DC/DC converter.

* * * * *